US012661590B2

(12) United States Patent
Akitsu et al.

(10) Patent No.: US 12,661,590 B2
(45) Date of Patent: Jun. 23, 2026

(54) PROGRAM, INFORMATION PROCESSING DEVICE, METHOD, AND SYSTEM

(71) Applicant: CYGAMES, INC., Tokyo (JP)

(72) Inventors: Takuma Akitsu, Tokyo (JP); Hironori Sato, Tokyo (JP); Yujiro Deguchi, Tokyo (JP); Kentaro Umeda, Tokyo (JP)

(73) Assignee: CYGAMES, INC., Tokyo (JP)

( * ) Notice: Subject to any disclaimer, the term of this patent is extended or adjusted under 35 U.S.C. 154(b) by 346 days.

(21) Appl. No.: 18/449,856

(22) Filed: Aug. 15, 2023

(65) Prior Publication Data

US 2023/0381657 A1 Nov. 30, 2023

Related U.S. Application Data

(63) Continuation of application No. PCT/JP2022/003302, filed on Jan. 28, 2022.

(30) Foreign Application Priority Data

Feb. 22, 2021 (JP) ................................. 2021-026609

(51) Int. Cl.
*A63F 13/60* (2014.01)
*A63F 13/327* (2014.01)
(Continued)

(52) U.S. Cl.
CPC ............ *A63F 13/60* (2014.09); *A63F 13/327* (2014.09); *A63F 13/79* (2014.09); *A63F 13/825* (2014.09)

(58) Field of Classification Search
CPC ........ A63F 13/60; A63F 13/327; A63F 13/79; A63F 13/825; A63F 13/58; A63F 13/69
See application file for complete search history.

(56) References Cited

U.S. PATENT DOCUMENTS

2001/0011034 A1* 8/2001 Sogabe ................... A63F 13/45
463/9
2008/0268930 A1* 10/2008 Miller ..................... A63F 13/10
463/6

FOREIGN PATENT DOCUMENTS

JP 2002-126349 A 5/2002
JP 2002-248264 A 9/2002
(Continued)

OTHER PUBLICATIONS

Office Action issued in the counterpart Japanese Application No. 2021-26609, mailed Oct. 10, 2023 (62 pages).
(Continued)

*Primary Examiner* — Thomas H Henry
(74) *Attorney, Agent, or Firm* — Osha Bergman Watanabe & Burton LLP

(57) ABSTRACT

Provided are a program, an information processing device, a method, and a system that make it possible to provide sociality in a raising game such that a player may be affected by other players, which serves to improve the fun of a game. An information processing device includes: a game-medium-to-inherit accepting means for accepting, as a game medium to inherit, a raised game medium associated with another player; and a raising-game executing means for executing a raising game so as to modify a raising parameter that changes in the raising game, on the basis of one or more items of characteristic information included in the game medium to inherit associated with the other player, and so as to generate a raised game medium associated with a player on the basis of the raising parameter upon the completion of the raising game.

8 Claims, 15 Drawing Sheets

(51) Int. Cl.
    *A63F 13/79*         (2014.01)
    *A63F 13/825*       (2014.01)

(56)               References Cited

FOREIGN PATENT DOCUMENTS

| JP | 2013-208223 A | 10/2013 |
| JP | 2017-006280 A | 1/2017 |
| JP | 2017-64081 A | 4/2017 |

OTHER PUBLICATIONS

"EBaseball Powerful Professional Baseball 2020 Official Perfect Guide", Toshima, Aug. 21, 2020 (74 pages).
"EBaseball Powerful Professional Baseball 2020 Top", Konami, [online], Aug. 8, 2020, URL: https://web.archive.org/web/20200808094626/https://www.konami.com/pawa/2020/ (7 pages).
"EBaseball Powerful Professional Baseball 2020 Mode", Konami, [online], Aug. 9, 2020, URL: https://web.archive.org/web/20200809063740/https://www.konami.com/pawa/2020/mode/ (18 pages).
"EBaseball Powerful Professional Baseball 2020 Pawapuro Zenyasai Online Mode", Konami, [online], Aug. 8, 2020, URL: https://web. archive.org/web/20200808093131/https://www.konami.com/pawa/2020/develo pment/timeline_5 (35 pages).
"Yahoo!Japan Answers PlayStation 4", [online], Jul. 18, 2020, URL: https://detail.chiebukuro.yahoo.co.jp/qa/question_detail/q11228604431 (10 pages).
"EBaseball Powerful Professional Baseball 2020 Update Information 7/9 the 1st update distribution", Konami, [online], Jul. 7, 2020, URL: https://www.konami.com/pawa/2020/update/200709 (5 pages).
"EBaseball Powerful Professional Baseball 2020 Update Information Jul. 2022 the 2nd update distribution", Konami, [online], Jul. 21, 2020, URL: https://www.konami.com/pawa/2020/update/200722 (3 pages).
"EBaseball Powerful Professional Baseball 2020 Update Information Update Information List", Konami, [online], Dec. 14, 2021, URL: https://www.konami.com/pawa/2020/updatelist (3 pages).
International Search Report issued in PCT/JP2022/003302 on Apr. 12, 2022 (5 pages).
Written Opinion of the International Searching Authority issued in PCT/JP2022/003302 on Apr. 12, 2022 (4 pages).
Office Action issued in corresponding Japanese Patent Application No. 2021-026609, mailed on Sep. 21, 2021 (6 pages).
Office Action issued in corresponding Japanese Patent Application No. 2021-026609, mailed on Jan. 19, 2022 (5 pages).

* cited by examiner

FIG.13

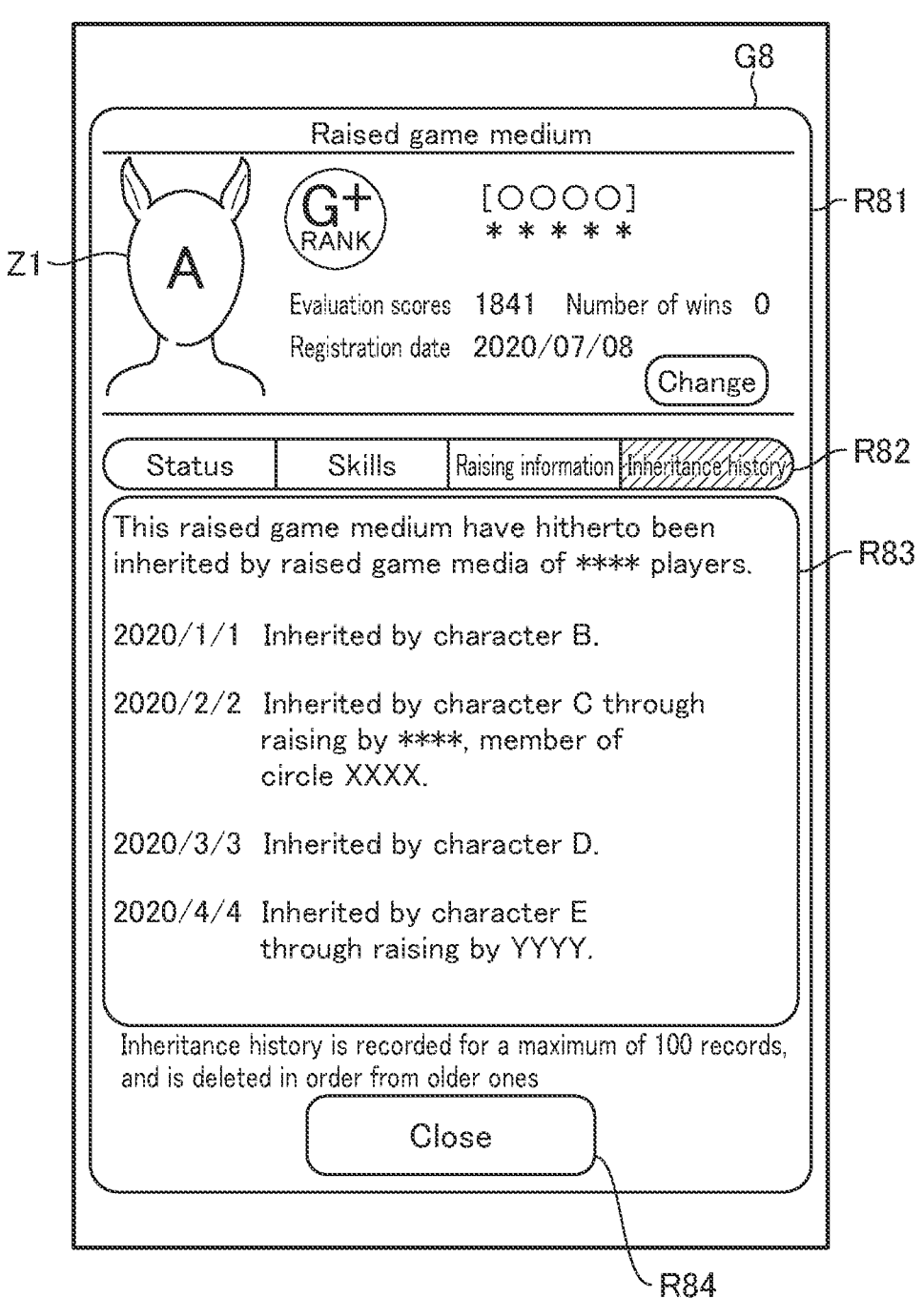

G8

Raised game medium

Z1

G+ RANK

A

[OOOO]
* * * * *

Evaluation scores  1841    Number of wins  0
Registration date  2020/07/08

Change

R81

Status | Skills | Raising information | Inheritance history

R82

This raised game medium have hitherto been inherited by raised game media of **** players.

2020/1/1   Inherited by character B.

2020/2/2   Inherited by character C through raising by ****, member of circle XXXX.

2020/3/3   Inherited by character D.

2020/4/4   Inherited by character E through raising by YYYY.

R83

Inheritance history is recorded for a maximum of 100 records, and is deleted in order from older ones Close

R84

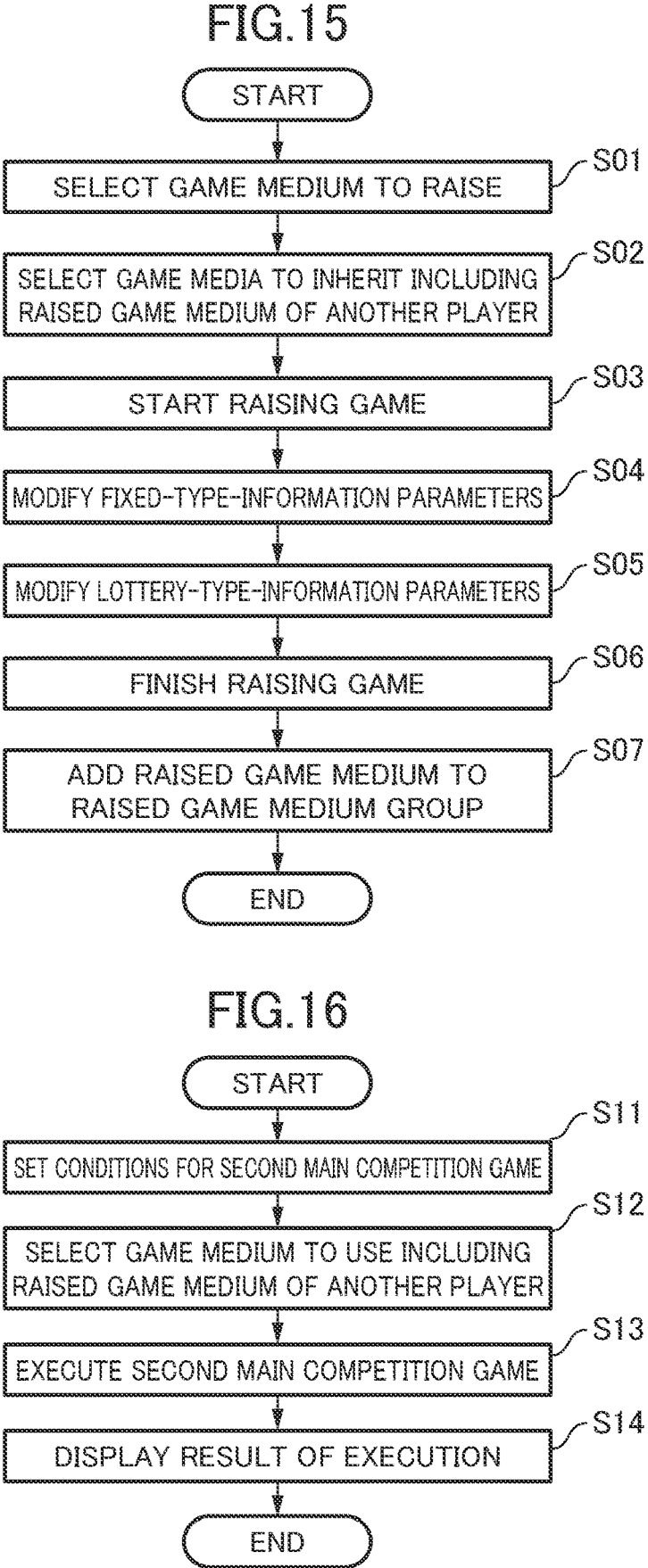

FIG.15

START

SELECT GAME MEDIUM TO RAISE ⟋ S01

SELECT GAME MEDIA TO INHERIT INCLUDING
RAISED GAME MEDIUM OF ANOTHER PLAYER ⟋ S02

START RAISING GAME ⟋ S03

MODIFY FIXED-TYPE-INFORMATION PARAMETERS ⟋ S04

MODIFY LOTTERY-TYPE-INFORMATION PARAMETERS ⟋ S05

FINISH RAISING GAME ⟋ S06

ADD RAISED GAME MEDIUM TO
RAISED GAME MEDIUM GROUP ⟋ S07

END

FIG.16

START

SET CONDITIONS FOR SECOND MAIN COMPETITION GAME ⟋ S11

SELECT GAME MEDIUM TO USE INCLUDING
RAISED GAME MEDIUM OF ANOTHER PLAYER ⟋ S12

EXECUTE SECOND MAIN COMPETITION GAME ⟋ S13

DISPLAY RESULT OF EXECUTION ⟋ S14

END

PROGRAM, INFORMATION PROCESSING DEVICE, METHOD, AND SYSTEM

TECHNICAL FIELD

The present invention relates to programs, etc. In particular, the present invention relates to a program, etc. for a raising game in which a game medium of a player is raised on the basis of a game medium of another player, selected by the player.

BACKGROUND ART

Recently, information processing devices such as smartphones have rapidly come into common use, and a large number of games that are executed on information processing devices have been released. Among games of this type, games in which game media such as racehorses are raised are known. In a known simulation game, a player selects a stallion and a mare that serve as parent horses, and a foal is produced from these parent horses and is raised (e.g., see Patent Literature 1).

CITATION LIST

Patent Literature

[PTL 1]
Japanese Unexamined Patent Application, Publication No. 2002-126349

SUMMARY OF INVENTION

Technical Problem

With this type of raising game, since the raising game proceeds on the basis of the parent horses of the player, the raising game lacks sociality that provides the fun of association with other players, which results in the problem of a tendency of decreasing the fun of the game.

The present invention has been made in order to solve the problem described above, and it is an object thereof to provide a program, an information processing device, a method, and a system that make it possible to provide sociality in a raising game such that a player may be affected by other players, which serves to improve the fun of a game.

Solution to Problem

A program according to an aspect of the present invention is a program for executing a game including a first main competition game and a raising game, in which a player raises a game medium in the raising game, the game medium being used in the first main competition game, the program being characterized by causing a computer to function as: a game-medium-to-inherit accepting means for accepting, as a game medium to inherit, a raised game medium selected from a raised game medium group including a plurality of raised game media that have been raised in the raising game, the game-medium-to-inherit accepting means accepting, as the game medium to inherit, the raised game medium associated with another player; and a raising-game executing means for executing the raising game so as to modify a raising parameter that changes in the raising game, on the basis of one or more items of characteristic information included in the game medium to inherit associated with the other player, and so as to generate the raised game medium associated with the player on the basis of the raising parameter upon the completion of the raising game.

An information processing device according to an aspect of the present invention is an information processing device that executes a game including a first main competition game and a raising game, in which a player raises a game medium in the raising game, the game medium being used in the first main competition game, the information processing device being characterized by including: a game-medium-to-inherit accepting means for accepting, as a game medium to inherit, a raised game medium selected from a raised game medium group including a plurality of raised game media that have been raised in the raising game, the game-medium-to-inherit accepting means accepting, as the game medium to inherit, the raised game medium associated with another player; and a raising-game executing means for executing the raising game so as to modify a raising parameter that changes in the raising game, on the basis of one or more items of characteristic information included in the game medium to inherit associated with the other player, and so as to generate the raised game medium associated with the player on the basis of the raising parameter upon the completion of the raising game.

A method according to an aspect of the present invention is a method for an information processing device to execute a game including a first main competition game and a raising game, in which a player raises a game medium in the raising game, the game medium being used in the first main competition game, the method being characterized by including: a game-medium-to-inherit accepting step of accepting, as a game medium to inherit, a raised game medium selected from a raised game medium group including a plurality of raised game media that have been raised in the raising game, in which the raised game medium associated with another player is accepted as the game medium to inherit; and a raising-game executing step of executing the raising game so as to modify a raising parameter that changes in the raising game, on the basis of one or more items of characteristic information included in the game medium to inherit associated with the other player, and so as to generate the raised game medium associated with the player on the basis of the raising parameter upon the completion of the raising game.

A system according to an aspect of the present invention is a game system that executes a game including a first main competition game and a raising game, in which a player raises a game medium in the raising game, the game medium being used in the first main competition game, the system being characterized by including an electronic device and a server connected to the electronic device via a network, and is characterized in that: the electronic device or the server functions as a game-medium-to-inherit accepting means for accepting, as a game medium to inherit, a raised game medium selected from a raised game medium group including a plurality of raised game media that have been raised in the raising game, the game-medium-to-inherit accepting means accepting, as the game medium to inherit, the raised game medium associated with another player; and the electronic device or the server functions as a raising-game executing means for executing the raising game so as to modify a raising parameter that changes in the raising game, on the basis of one or more items of characteristic information included in the game medium to inherit associated with the other player, and so as to generate the raised game medium associated with the player on the basis of the raising parameter upon the completion of the raising game.

Advantageous Effects of Invention

The present invention makes it possible to provide sociality in a raising game such that a player may be affected by other players, which serves to improve the fun of a game.

BRIEF DESCRIPTION OF DRAWINGS

FIG. 13 shows an example raised-game-medium detail screen.

FIG. 15 is an example operation flowchart, concerning the raising game, of the information processing device according to the embodiment of the present invention.

FIG. 16 is an example operation flowchart, concerning a second main competition game, of the information processing device according to the embodiment of the present invention.

DESCRIPTION OF EMBODIMENTS

Game systems according to embodiments of the present invention will be described with reference to the drawings. In the present description, there are cases where descriptions that are more detailed than necessary are omitted for convenience of description. For example, there are cases where detailed descriptions of matters that are already well known and repeated descriptions of substantially the same configurations are omitted.

The game system can be realized by a system in which a plurality of information processing devices are connected via a network; however, the game system can also be realized by a single information processing device. The description will first be directed to an embodiment implemented by a single information processing device, and then to a system connected to a network.

[Embodiment Implemented by Information Processing Device]

[Configuration]

Figure 1:
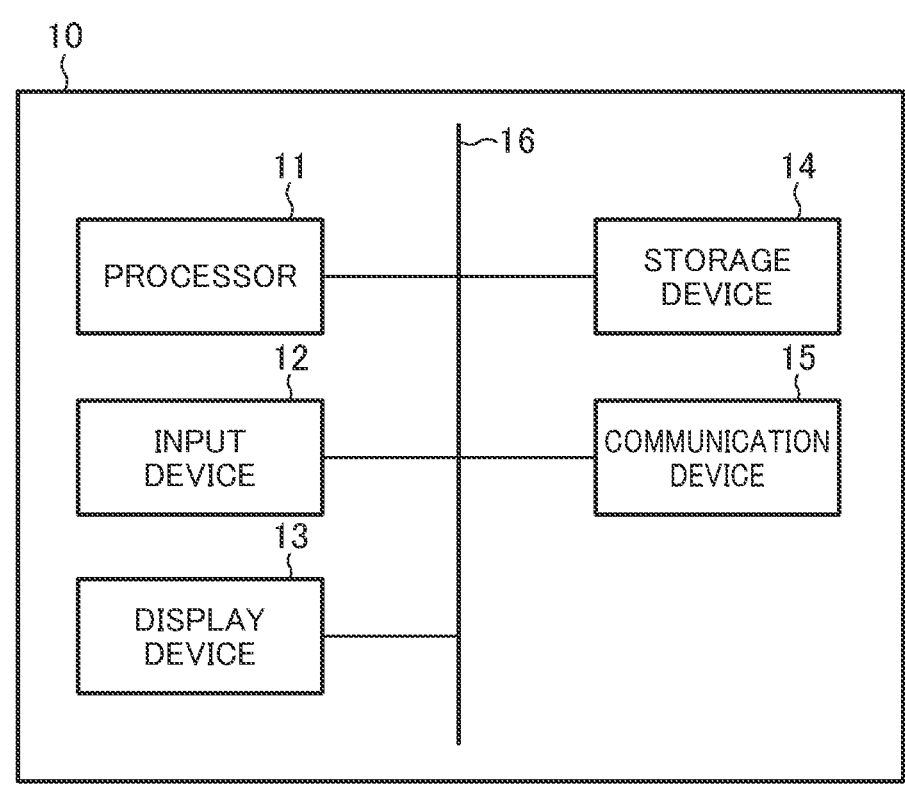
FIG. 1 is a block diagram showing the hardware configuration of an information processing device according to an embodiment of the present invention.

FIG. 1 is a block diagram showing the hardware configuration of an information processing device 10 according to an embodiment of the present invention. The information processing device 10 includes a processor 11, an input device 12, a display device 13, a storage device 14, and a communication device 15. These individual constituent devices 11 to 15 are connected via a bus 16. Note that interfaces may be interposed as needed between the bus 16 and the individual constituent devices 11 to 15. In this embodiment, the information processing device 10 is a smartphone. However, the information processing device 10 may be other computers including the configuration described above, such as a tablet computer, a laptop computer, or a desktop computer.

The processor 11 controls the operation of the information processing device 10 as a whole; for example, the processor 11 is an electronic circuit such as a CPU or an MPU. The processor 11 executes various kinds of processing by loading programs and data stored in the storage device 14 and executing the programs. In one example, the processor 11 is constituted of a plurality of processors.

The input device 12 is a user interface that accepts inputs to the information processing device 10 from a user; for example, the input device 12 is a touch panel, a touchpad, a keyboard, or a mouse. Since the information processing device 10 in this embodiment is a smartphone, the information processing device 10 includes a touchscreen, which functions as both the input device 12 and the display device 13. The input device 12 and the display device 13 may be provided in separate forms and disposed at different positions.

The display device 13 displays application screens, etc. to the user of the information processing device 10, i.e., the player, under the control of the processor 11. As the display device 13, a liquid crystal display, an organic EL display, a plasma display, or the like can be used.

The storage device 14 includes a main memory, a buffer memory, and a storage. The storage device 14 is a storage device included in an ordinary smartphone or computer, such as a RAM, which is a volatile memory, a flash-memory-based storage device, such as an eMMC, a UFS, or an SSD, and a magnetic storage device. The storage device 14 may include an external memory. The storage device 14 stores, for example, a game application. The game application includes a game program for executing a game, as well as various kinds of data that are referred to during the execution of the game program. The game program is activated in response to the user performing an operation on the information processing device 10, and is executed on an operating system (OS) implemented in advance in the information processing device 10.

In one example, the storage device 14 includes a main storage device and an auxiliary storage device. The main storage device is a volatile storage medium that allows high-speed reading and writing of information, and is used as a storage area and a work area when the processor 11 processes information. The auxiliary storage device stores various programs, as well as data that are used by the individual programs when the programs are executed. The auxiliary storage device is, for example, an SSD or a hard disk device. However, the auxiliary storage device may be any type of non-volatile storage or non-volatile memory that is capable of storing information, which may be of the removable type. The auxiliary storage device stores, for example, an operating system (OS), middleware, application programs, various kinds of data that may be referred to as these programs are executed, etc.

The communication device 15 sends data to and receives data from other computers, such as servers, via a network. For example, the communication device 15 connects to a network by carrying out wireless communication, such as mobile communication or wireless LAN communication. In one example, the information processing device 10 downloads a program from a server by using the communication device 15 and stores the program in the storage device 14. Alternatively, the communication device 15 may carry out wired communication by using an Ethernet (registered trademark) cable or the like. In the case where data is not sent to or received from other computers, the information processing device 10 need not include the communication device 15.

Figure 2:
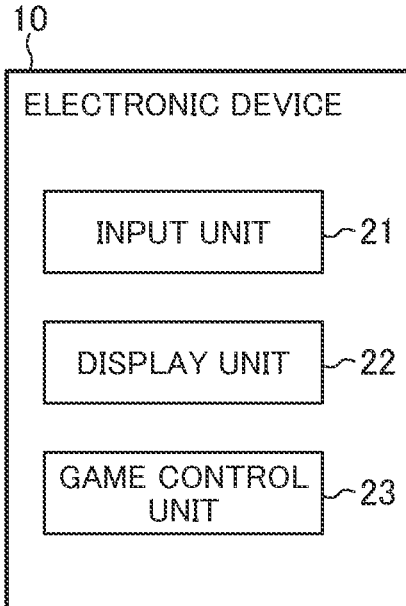
FIG. 2 shows an example functional block diagram of the information processing device according to the embodiment of the present invention.

FIG. 2 is an example functional block diagram of the information processing device 10 according to the embodiment of the present invention. The information processing device 10 includes an input unit 21, a display unit 22, and a game control unit 23. In this embodiment, these functions are realized by the processor 11 executing a program. For example, the program that is executed is a game program stored in the storage device 14 or received via the communication device 15. Since various functions are realized by loading a program, as described above, a portion or the entirety of one part (function) may be provided in another part. The various functions are realized as individual means by executing the program. Alternatively, these functions may be realized by means of hardware by configuring electronic circuits or the like for realizing the individual functions in part or in entirety.

The input unit 21 is configured by using the input device 12, and accepts inputs to the information processing device 10 from the user. In this embodiment, it is possible to use the touch detection function of the touch panel, which is generally provided in smartphones.

The display unit 22 is configured by using the display device 13, and displays game screens corresponding to the proceeding of the game and user operations. The game control unit 23 performs basic control for executing the game in this embodiment. The game in this embodiment is a game including main competition games and a raising game. Specifically, a player of the game raises a game medium in the raising game, and uses the raised game medium in the main competition games. The game medium is electronic data that is used in the game, e.g., a character or an equipment item such as a weapon, an item, or a card. The game medium in this embodiment is a character.

The main competition games in this embodiment are games in which characters serving as game media run a prescribed distance along a prescribed course and compete for places, like a horse racing game. The main competition games include a first main competition game and a second main competition game. The first main competition game is a game that is provided to a player, and is a race game at least including a raised game medium of the player. The second main competition game is a game that is provided to a player, and is a race game at least including a raised game medium of the player or a raised game medium of another player who is different from the player, which is selected by the player. Here, a raised game medium of a player here refers to a raised game medium that has been raised by the player in the raising game, and a raised game medium of another player refers to a raised game medium that has been raised by the other player in the raising game. The raising game in this embodiment is a game in which a game medium that is to participate in the first main competition game is raised. The raising game is a game in which a character represented by a raised game medium is trained and raised in the course of a scenario and in which one or more items of characteristic information included in a game medium to inherit, which will be described later, are inherited by the raised game medium.

Figure 3:
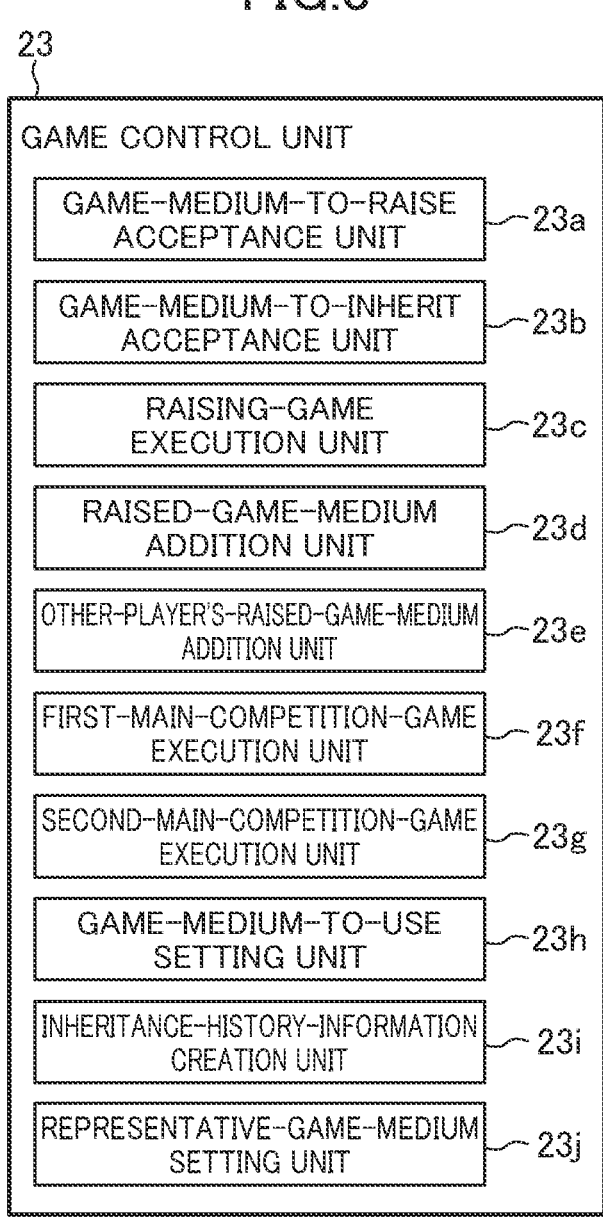
FIG. 3 shows an example functional block diagram of a game control unit.

FIG. 3 is an example functional block diagram of a game control unit. As shown in FIG. 3, the game control unit 23 includes a game-medium-to-raise acceptance unit 23a, a game-medium-to-inherit acceptance unit 23b, a raising-game execution unit 23c, a raised-game-medium addition unit 23d, an other-player's-raised-game-medium addition unit 23e, a first-main-competition-game execution unit 23f, a second-main-competition-game execution unit 23g, a game-medium-to-use setting unit 23h, an inheritance-history-information creation unit 23i, and a representative-game-medium setting unit 23j.

The game-medium-to-raise acceptance unit 23a is configured to include the processor 11 and the input unit 12, and accepts, as a game medium to raise, which is raised in the raising game, a material game medium selected by a player from a material game medium group.

The material game medium group is a group of game media configured to include a plurality of material game media. The material game media are electronic data that serve as the basis of a game medium to raise, which is raised in the raising game, and each of the material game media has individually associated therewith a unique ID, an image of a character to be displayed on the display device 13, a character ID uniquely identifying the character, and characteristic information. The characteristic information is information indicating the characteristics of the material game medium, such as parameters indicating the abilities and skills of the material game medium (character). In this embodiment, various parameters are set to all for each kind of characteristic information. In other words, while the abilities and skills vary depending on the kind (character) of the material game medium, a prescribed parameter value (e.g., 0) can be used in the case where an ability or skill is absent. Furthermore, the various parameters have associated therewith a plurality of different values of ranks or levels, such as rarities. The material game media and the material game medium group are prestored in the storage device 14, such as a non-volatile storage. Alternatively, the player may later acquire some or all of the material game media through a probability-based lottery game or a like and may store the acquired material game media in the storage device 14. The characteristic information of the material game media may be increased when a prescribed condition is satisfied, e.g., when an item has been consumed. In one example, when the player has consumed a possessed item, the parameter value of the characteristic information associated with the consumed item is increased. The consumption of an item associated with a player operation is executed, for example, by the game-medium-to-raise acceptance unit 23a.

Note that the game-medium-to-raise acceptance unit 23a need not be a necessary element of the game control unit 23, and a game medium to raise may be predefined by a game developer, a game administrator, or the like. Alternatively, the raised-game medium itself may be omitted. That is, raising parameters in the raising game, which will be described later, may be adopted instead of the game medium to raise.

The game medium to raise is a game medium that is raised in the raising game. In this embodiment, at the start of the raising game, the game medium to raise is electronic data obtained by copying the material game medium selected by the player from the material game medium group. Note that the ID of the game medium to raise is a unique ID. That is, a kind of ID that is different from the ID of the material game medium is assigned as the ID of the game medium to raise. For example, supposing that the ID of a certain material game medium selected by the player is S1, I1 is assigned as the ID of the game medium to raise. In this embodiment, the game medium to raise has individually associated therewith the unique ID, an image of a character to be displayed on the display device 13, a character ID uniquely identifying the character, and raising parameters indicating the characteristics of the game medium to raise. The character image and the character ID are the same as the character image and the character ID of the material game medium.

The raising parameters are provided individually for all the characteristics that are used in the raising game. At the start of the raising game, the raising parameters are the same as the characteristic information of the material game medium, and various raising parameters are added or modified in the course of the proceeding of the raising game. That is, the raising parameters are variables that change in the course of the raising game. At the start of the raising game, the various parameter values of the characteristic information of the material game medium selected by the player are assigned to the raising parameters as initial values, so that the raising parameters are equal to the various parameter values of the characteristic information of the selected material game medium. During the raising game, the raising parameters change on the basis of training, one or more items of characteristic information of a game medium to inherit, which will be described later, etc. At the completion of the raising game, the values of the various raising parameters become various parameter values of the characteristic information of a raised game medium that has been raised in the raising game, which will be described later. In other words, after the completion of the raising game, the raising parameters are associated with the character ID with which the individual values of the raising parameters at that time are included in the game medium to raise. The raising parameters need not be associated with the game medium to raise during the raising game. In this embodiment, the raising parameters are defined (declared) in a raising-game program so as to be embedded in the raising game such that the raising parameters are not associated with and are independent of the character ID during the raising game. For example, in the raising-game program, a character ID variable and raising parameters are defined separately, and the material game medium selected by the player is copied, when the character ID of the material game medium is loaded into the character ID variable, and the parameter values of the characteristic information of the material game medium are loaded into the raising parameters. The game medium to raise is stored in the storage device 14, such as a volatile recording medium. As described above, the game medium to raise is electronic data based on the material game medium and is independent of the material game medium, so that the material game medium is maintained instead of vanishing. That is, the player can raise the same material game medium each time the player plays the raising game, as many times as the player wishes.

Figure 4:
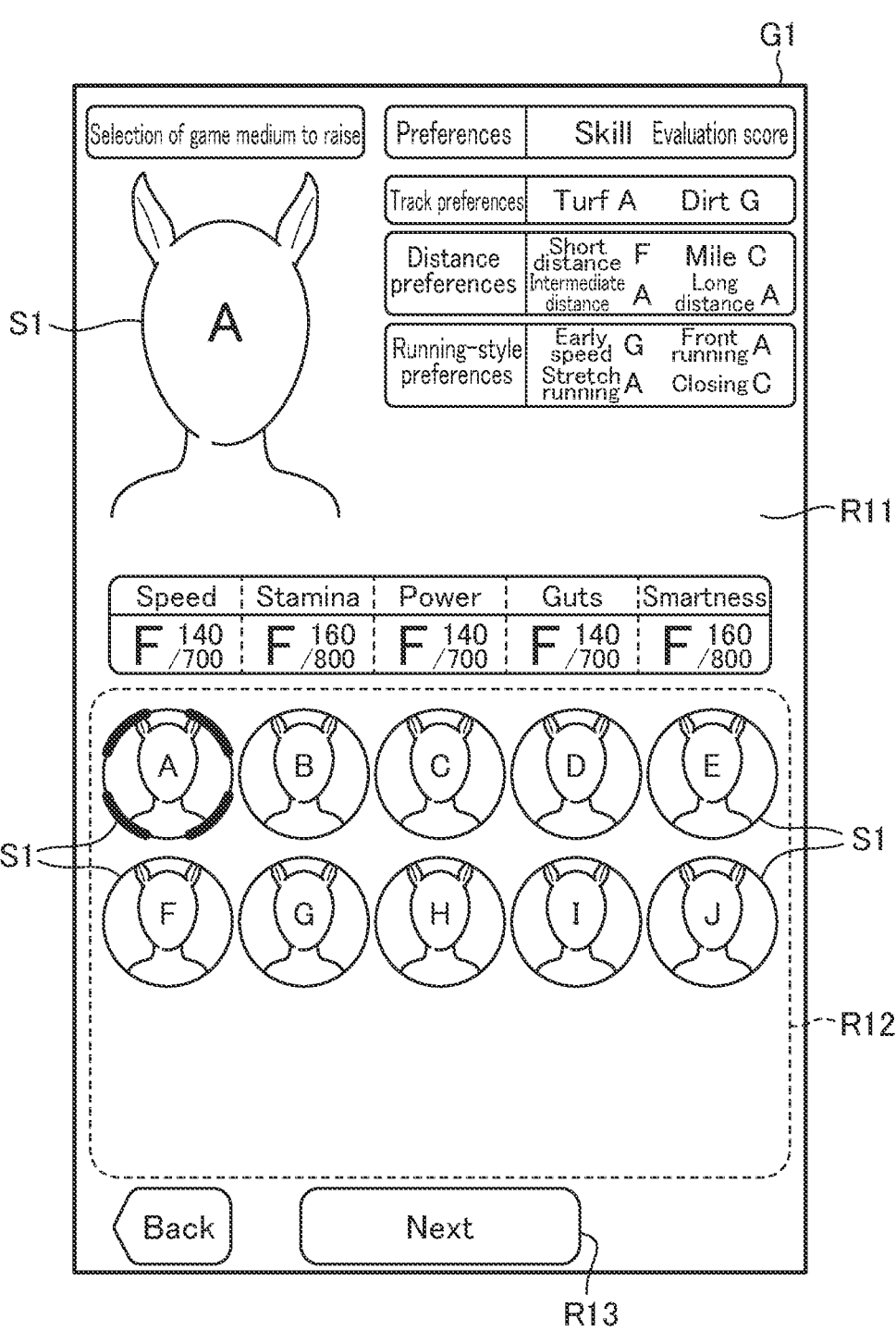
FIG. 4 shows an example game-medium-to-raise selection screen.

FIG. 4 shows an example game-medium-to-raise selection screen. As shown in FIG. 4, the game-medium-to-raise acceptance unit 23a causes the display device 13 to display a game-medium-to-raise selection screen G1, and accepts the selection of a material game medium by the player via the input unit 12. The game-medium-to-raise selection screen G1 includes a material-game-medium-group display area R12, a selected-material-game-medium display area R11, and an OK button R13.

In the material-game-medium-group display area R12, material game media (e.g., images S1 thereof) are displayed. In the example in FIG. 4, images S1 of a plurality of material game media (characters A to J here) are displayed. In this embodiment, since the display device 13 and the input unit 12 are implemented by the touchscreen of the information processing device 10, it is possible to accept the selection of one material game medium displayed in the material-game-medium-group display area R12, with a player's finger or the like.

The selected-material-game-medium display area R11 is displayed so as to include the image S1 and characteristic information of the material game medium selected from among the plurality of material game media. Examples of the characteristic information include basic ability parameters indicating speed, stamina, power, guts, and smartness, as well as preference parameters including track preferences, distance preferences, and running-style preferences. The track preferences include, for example, preferences concerning turf and preferences concerning dirt. The distance characteristics include, for example, short-distance characteristics, mile characteristics, intermediate-distance characteristics, and long-distance characteristics. The running-style characteristics include early speed characteristics, front running characteristics, stretch running characteristics, and closing characteristics. The individual parameters are, for example, numerical values. As one example, together with numerical values, ranks or levels may be displayed in the form of ABC indications or the like in accordance with differences in the values. For example, rank A indicates the highest preference, and the preference becomes lower as the rank becomes remoter from rank A. In one example, a trait of high speed is indicated in the case where the speed parameter is indicated as rank A, and a trait of low speed is indicated in the case where the speed parameter is indicated as rank G.

The OK button R13 is a button for determining the selected material game medium as a game medium to raise, which is raised in the raising game. The game-medium-to-raise acceptance unit 23a receives a signal indicating that the input unit 12 has detected pressing of the OK button R3, identifies the material game medium selected in the selected-material-game-medium display area R11 at that time, copies the material game medium, and stores the copy of the material game medium as a game medium to raise, with a different ID assigned thereto, in the storage device 14.

The game-medium-to-inherit acceptance unit 23b is configured to include the processor 11 and the input unit 12, and accepts, as a game medium to inherit, a raised game medium selected from a raised game medium group. The game-medium-to-inherit acceptance unit 23b may accept the selection of a raised game medium according to player's selection or at random without depending on the player. In this embodiment, the selection of a raised game medium is accepted according to player's selection.

The raised game medium group is a group of game media configured to include a plurality of raised game media. Each of the raised game media is a raised game medium that has been raised in the raising game, and has associated therewith a unique ID, an image of a character to be displayed on the display device 13, a character ID uniquely identifying the character, and characteristic information. As the ID of the raised game medium, a kind of ID that is different from the ID of the game medium to raise that has been raised in the raising game is assigned. For example, supposing that the ID of the game medium to raise is I1, IZ1 is assigned as the ID of the raised game medium. The character ID may be the same among a plurality of raised game media. In the case where a player has selected a certain material game medium as a game medium to raise and a raised game medium has been generated through the raising game, the material game medium, the game medium to raise, and the raised game medium share the same character ID. Furthermore, when the material game medium selected once before has been selected again and a raised game medium has been selected through the raising game by using the material game medium as a game medium to raise, the character ID of the raised game medium generated when the raising game was played for the first time and the character ID of the raised game medium generated when the raising game was played for the second time are the same. The characteristic information is information indicating the characteristics of the raised game medium, such as parameters indicating the abilities and skills of the raised game medium. The raised game media and the raised game medium group are pre-stored in the storage device 14. Furthermore, in the case where a raised game medium has been newly generated, the raised game medium is stored in the storage device 14.

Furthermore, the raised game medium group includes a player's raised game medium group including a plurality of raised game media associated with the player (e.g., the player ID), as well as an other-player's raised game medium group including a plurality of raised game media associated with another player (e.g., the player ID of the other player). In other words, the game-medium-to-inherit acceptance unit 23b can accept, as a game medium to inherit, a raised game medium selected by the player and associated with the player, and can also accept, as a game medium to inherit, a raised game medium selected by the player and associated with another player. Note that the basic data structure of the raised game medium is the same between the case where the raised game medium is associated with the player and the case where the raised game medium is associated with another player. In one example, by associating a raised game medium possessed by another player with the player, it becomes possible to handle the raised game medium in the same manner as a raised game medium possessed by the player. In another example, when the game-medium-to-inherit acceptance unit 23b has randomly copied or referred to a raised game medium associated with another player, it becomes possible to handle the raised game medium associated with the other player in the same manner as a raised game medium possessed by the player. In yet another example, a raised game medium possessed by another player may be obtained by copying or referring to information posted in a chat within the game, which will be described later, such as a player ID and a character ID of a raised game medium associated with the player.

A game medium to inherit is a raised game medium selected from among the raised game medium group. The game medium to inherit may be selected by the player or may be selected at random without depending on player's selection. In one example, the game medium to inherit is electronic data obtained by copying or referring to a raised game medium selected by the player and associated with the player. In another example, the game medium to inherit is electronic data obtained by copying or referring to a raised game medium selected by the player and associated with another player. In the case where the game-medium-to-inherit acceptance unit 23b accepts two game media to inherit, when broadly classified, the player has the following three patterns of selecting game media to inherit. A first pattern is to select a raised game medium associated with another player as both of the two game media to inherit. A second pattern is to select a raised game medium associated with another player as one of the two game media to inherit and to select a raised game medium associated with the player as the other. A third pattern is to select a raised game medium associated with the player as both of the two game media to inherit.

The game-medium-to-inherit acceptance unit 23b can charge the player for a rental fee in the case where the player accepts a raised game medium associated with another player as a game medium to inherit. The rental fee is paid in terms of an in-game virtual currency for allowing the player to set a raised game medium associated with another player as a game medium to inherit, and the rental fee can be set in advance depending on the level or rank of the raised game medium associated with the other player. The game-medium-to-inherit acceptance unit 23b may award the rental fee in part or in entirety to the other player associated with the raised game medium set as the game medium to inherit.

Figure 5:
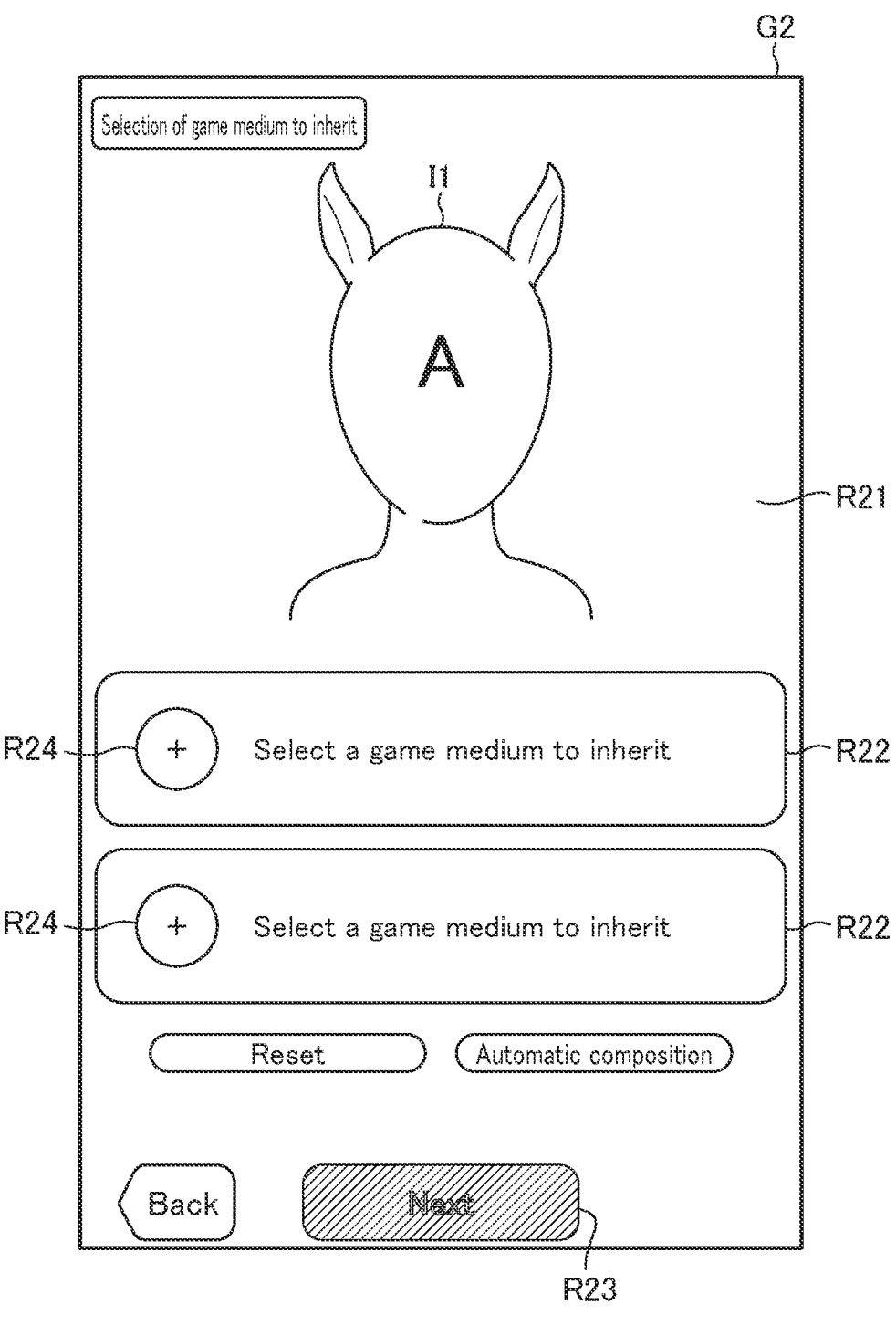
FIG. 5 shows an example game-medium-to-inherit preselection screen.
Figure 6:
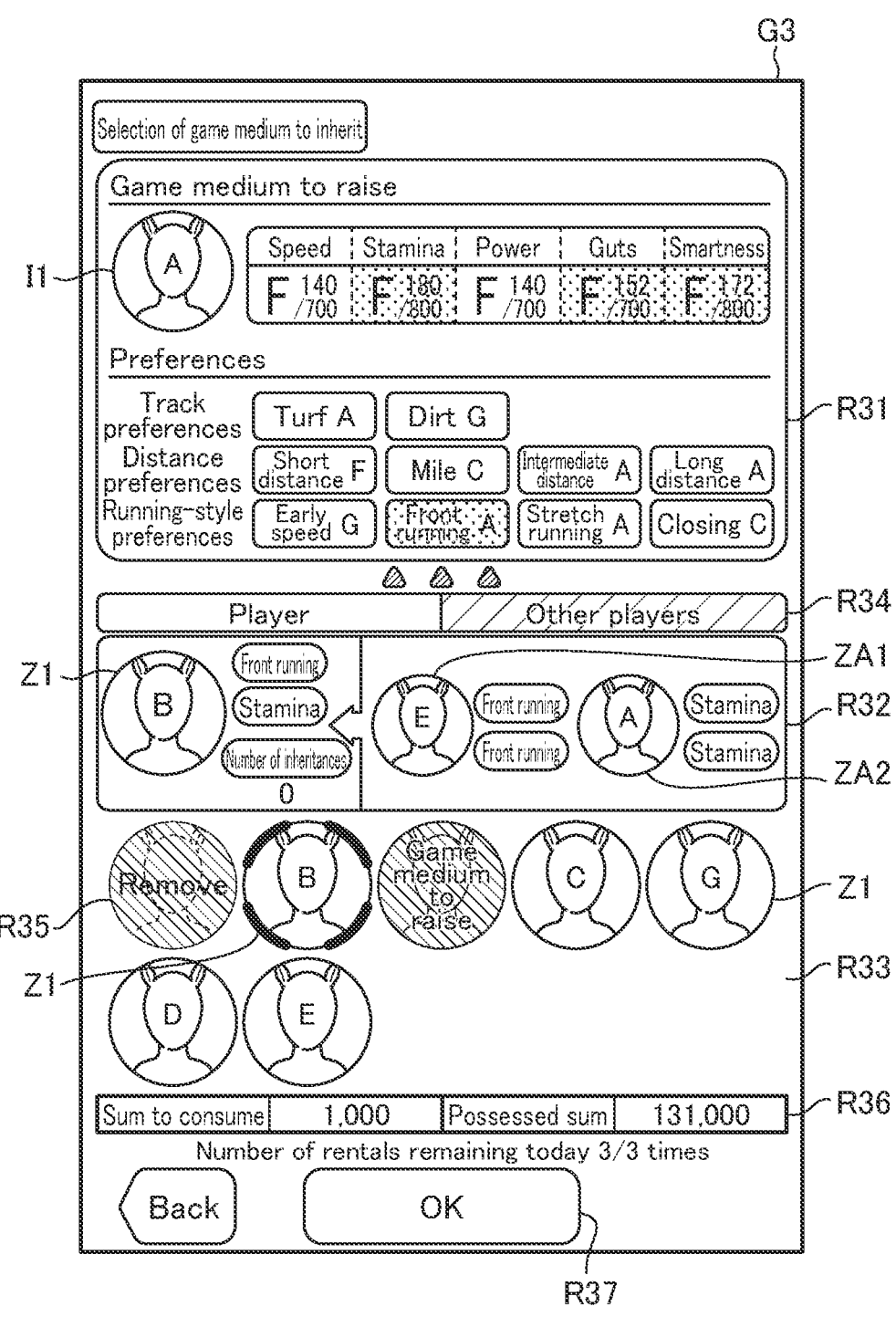
FIG. 6 shows an example game-medium-to-inherit selection screen.
Figure 7:
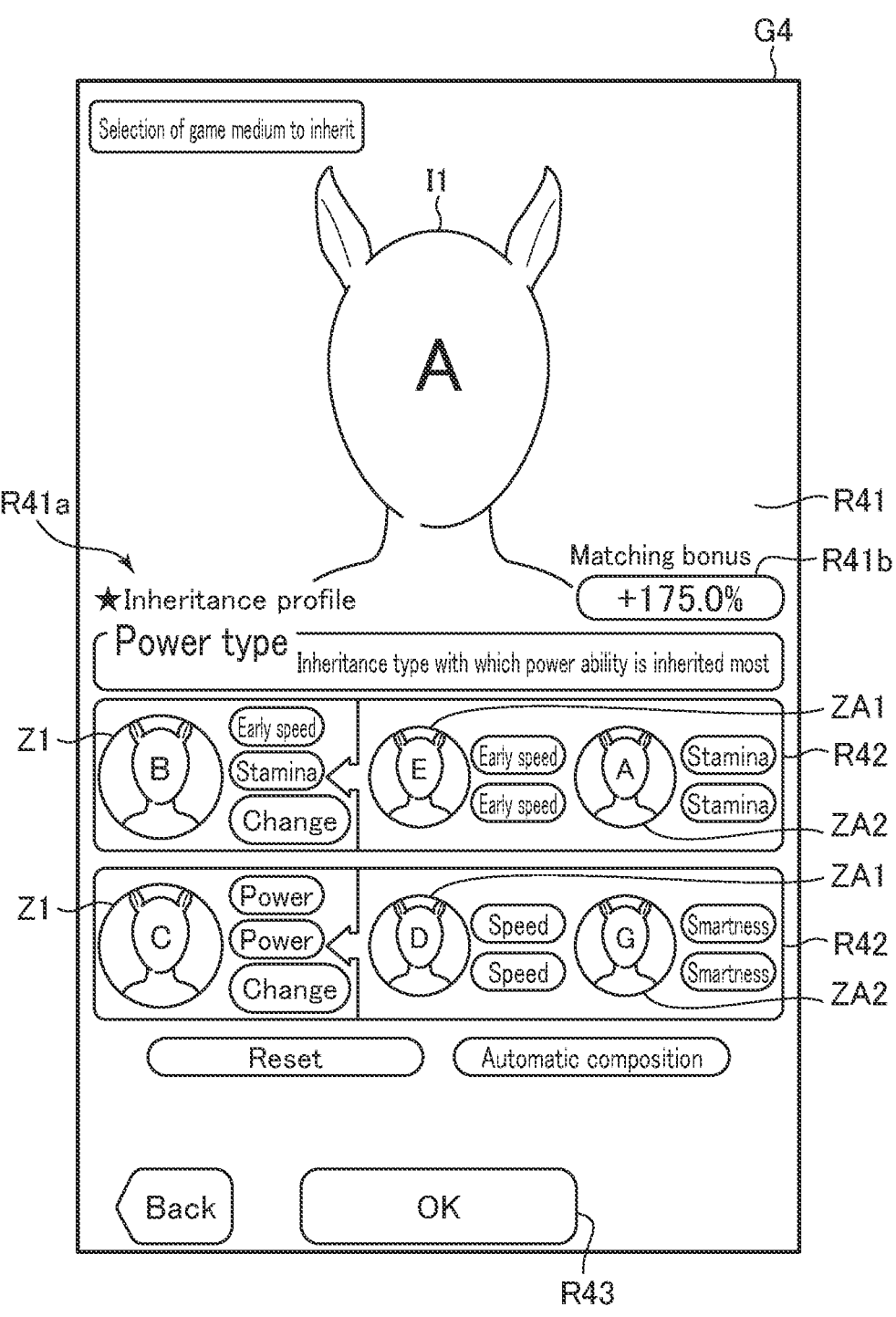
FIG. 7 shows an example game-medium-to-inherit confirmation screen.

FIG. 5 shows an example game-medium-to-inherit pre-selection screen. FIG. 6 shows an example game-medium-to-inherit selection screen. FIG. 7 shows an example game-medium-to-inherit confirmation screen. As shown in FIGS. 5 to 7, the game-medium-to-inherit acceptance unit 23b causes the display device 13 to display a game-medium-to-inherit pre-selection screen G2, a game-medium-to-inherit selection screen G3, and a game-medium-to-inherit confirmation screen G4 individually, and accepts the selection of a game medium to inherit by the player via the input unit 12. The game-medium-to-inherit pre-selection screen G2, the game-medium-to-inherit selection screen G3, and the game-medium-to-inherit confirmation screen G4 are screens for selecting a game medium to inherit from among a plurality of raised game media.

The game-medium-to-inherit pre-selection screen G2 includes a raised-game-medium display area R21, game-medium-to-inherit selection areas R22, and an OK button R23. The raised-game-medium display area R21 is displayed so as to include an image I1 of a game medium to raise. Each of the game-medium-to-inherit selection areas R22 is an area for adding a game medium to inherit, and includes an add button R24 for adding a game medium to inherit. In this embodiment, in order to allow selection of two game media to inherit, two game-medium-to-inherit selection areas R22 are provided. When each of the add buttons R24 is pressed by the player, the game-medium-to-inherit acceptance unit 23b causes the display device 13 to display the game-medium-to-inherit selection screen G3 individually.

Each of the OK buttons R23 is a button for determining a selected raised game medium as a game medium to inherit. In FIG. 5, however, since no game medium to inherit has been selected yet, the OK buttons R23 are grayed out.

The game-medium-to-inherit selection screen G3 includes a game-medium-to-raise display area R31, a game-medium-to-inherit tentative selection area R32, a raised-game-medium-group display area R33, a switching-tab display area R34, a rental-fee display area R36, and an OK button R37.

In the game-medium-to-raise display area R31, an image I1 of the game medium to raise, as well as various items of characteristic information thereof, are displayed, which facilitates selection of a game medium to inherit. In the game-medium-to-inherit tentative selection area R32, an image Z1 and characteristic information of a raised game medium currently selected as a candidate for a game medium to inherit are displayed, and next thereto, images ZA1 and ZA2 as well as characteristic information of a raised game medium set as a game medium to inherit in the raising game in which the raised game medium selected as the game medium to inherit was raised (hereinafter also referred to as a previous-generation raised game medium serving as an inheritance source) are displayed, which makes it easier for the player to consider combinations with the game medium to raise. In one example, as the characteristic information that is displayed in the game-medium-to-inherit tentative selection area R32, of the two or more items of characteristics information included in the game medium to inherit or the previous-generation raised game medium serving as an inheritance source therefor, two items of characteristic information having relatively high ranks or levels in that game medium (e.g., the item of characteristic information having the highest rank and the item of characteristic information having the next highest rank) can be displayed. In another example, in the game-medium-to-inherit tentative selection area R32, all the items of characteristic information included in the game medium to inherit or the previous-generation raised game medium serving as an inheritance source therefor can be displayed. Here, it is displayed that the raised game medium of character B includes two or more items of characteristic information, such as "early speed" and "stamina", the previous-generation raised game medium serving as an inheritance source for character E has an item of characteristic information "early speed", and the previous-generation raised game medium serving as an inheritance source for character A includes an item of characteristic information "stamina". Furthermore, it is displayed that the raised game medium of character B has been raised by using the raised game media of character E and character A as game media to inherit.

In the raised-game-medium-group display area R33, images Z1 of a plurality of raised game media are displayed. In the region R33, a remove button R35 may be displayed. The remove button R35 is a button for reducing the number of game media to inherit. In this embodiment, two game media to inherit are set, but the game-medium-to-inherit acceptance unit 23b can reduce the number of set game media to inherit to one by pressing the remove button 35. In the case where the game medium to raise and the raised game medium are based on the same material game medium, the raised game medium may be displayed in a grayed-out manner so as to prohibit selection thereof, or may be omitted from the displayed content instead of being grayed out. The reason for prohibiting selection as a game medium to inherit in the case where the material game medium is shared is to ensure the fun of the game. This grayed-out displaying can be realized, for example, by associating the ID of the material game medium selected as a game medium to raise with the ID of the raised game medium. Note that although it is not allowed to select, as a game medium to inherit, a raised game medium of the same character as the game medium to raise, as indicated in the game-medium-to-inherit tentative selection area R32, it is possible to select, as a game medium to inherit, a raised game medium (character B here) related to the previous-generation raised game medium serving as an inheritance source for the same character (character A here) as the game medium to raise.

In the switching-tab display area R34, tabs for switching the raised game medium group displayed in the raisedgame-medium-group display area R33 are displayed. The switching-tab display area R34 is displayed so as to include a player tab for selecting a raised game medium group associated with the player and an other-players tab for selecting a raised game medium group associated with another player. In the case where the player tab is selected, images Z1 of the plurality of raised game media associated with the player are displayed in the raised-game-medium-group display area R33. In the case where the other-players tab is selected, images Z1 of the plurality of raised game media associated with other players are displayed in the raised-game-medium-group display area R33. In the example shown in FIG. 6, the other-players tab is selected.

The rental-fee display area R36 is displayed in the game-medium-to-inherit selection screen G3 in the case where the other-players tab is selected and a plurality of raised game media associated with other players are displayed in the raised-game-medium-group display area R33. In the rental-fee display area 36R, a rental fee for the selected raised game medium associated with the other player, as well as the amount of sum owned by the player in the game, are displayed. This serves as a reference for the player in determining which raised game medium to use as a game medium to inherit. The rental fee is the sum of in-game virtual currency necessary for setting, as a game medium to inherit, a raised game medium associated with another player. Furthermore, the game-medium-to-inherit acceptance unit 23b may set a limitation to the number of rentals (i.e., setting as a game to inherit) permitted per day, and this number and the current number of rentals may be displayed in the game-medium-to-inherit selection screen G3. Furthermore, the game-medium-to-inherit acceptance unit 23b may set a limitation that the number of raised game media of another player that can be set is not greater than one. This makes it possible to improve sociality with other players, while maintaining motivation for raising game media on one's own.

The OK button R37 is a button for selecting, as a game medium to inherit, the raised game medium selected in the raised-game-medium-group display area R33.

The game-medium-to-inherit confirmation screen G4 includes a game-medium-to-raise display area R41, game-medium-to-inherit confirmation areas R42, and an OK button R43.

The game-medium-to-raise display area R41 is displayed so as to include an image I1 of the game medium to raise, an inheritance profile R41a, and a matching bonus value R41b. The inheritance profile R41a is an indication of characteristic information that is likely to be inherited from the two selected game media to inherit. The game-medium-to-inherit acceptance unit 23b causes the display device 13 to display the inheritance profile R41a. In one example, among all the items of characteristic information or prescribed items of characteristic information (e.g., basic ability parameters and/or preference parameters) included in the individual game media to inherit, the game-medium-to-inherit acceptance unit 23b considers the item of characteristic information having the highest rank or level as the item of characteristic information that is likely to be inherited. In another example, the game-medium-to-inherit acceptance unit 23b obtains the item of characteristic information that is likely to be inherited by the game medium to raise on the basis of the matching between the game medium to raise and the game medium to inherit in the case where the selected raised game medium is set as the game medium to inherit, and displays the result as the inheritance profile R41a. For example, among items of lottery-type information of game media to inherit, which will be described later, the game-medium-to-inherit acceptance unit 23*b* identifies an item of lottery-type information corresponding to the lottery-type information and having a relatively high probability of expression, which will be described later, as an item of lottery-type information that is likely to be inherited. In another example, the game-medium-to-inherit acceptance unit 23*b* sums the individual items of characteristic information of the individual game media to inherit, or the profile values associated with the ranks or levels thereof, for each kind of characteristic information, and causes the display device 13 to display the kind of characteristic information having the greatest total value as the inheritance profile R41*a*. Specifically, the individual items of characteristic information of individual game media to inherit, or the ranks or levels thereof, have associated therewith profile values indicating inheritance profiles of prescribed kinds of characteristic information. For example, in the case where, for two game media to inherit, a profile value 1 indicating speed is associated with characteristic information rank 1 indicating speed, a profile value 2 indicating speed is associated with characteristic information rank 2 indicating speed, a profile value 5 indicating power is associated with characteristic information rank 5 indicating power, a profile value 1 indicating speed is associated with characteristic information rank 1 indicating turn preference, and a profile value 2 indicating power is associated with characteristic information rank 2 indicating short-distance preference, since the sum of the profile values concerning speed is four, the sum of the profile values concerning power is seven, and the sum of the profile values concerning others is zero, it is identified that the kind of characteristic information for which the sum of the individual items of characteristic information becomes the greatest is power. Therefore, the inheritance profile R41*a* that the game-medium-to-inherit acceptance unit 23*b* causes the display device 13 to display is the power type.

The matching bonus value R41*b* indicates a value obtained by numerating the matching between the game medium to raise and the individual game media to inherit as well as the matching between the game medium to raise and the previous-generation raised game media serving as inheritance sources for the individual game media to inherit and calculating the sum thereof, as will be described later. The matching bonus value R41*b* indicates the degree of influence on the inheritance of the characteristic information of a game medium to inherit by the game medium to raise. The game-medium-to-inherit acceptance unit 23*b* causes the display device 13 to display the matching bonus value R41*b*. Specifically, the game-medium-to-inherit acceptance unit 23*b* calculates and displays a matching bonus value on the basis of, in the case where the selected raised game medium is set as a game medium to inherit, a value associated with the relationship between the raised game medium and the game medium to inherit and/or a value associated with the relationship between the game medium to raise and the previous-generation raised game medium serving as an inheritance source. For example, the game-medium-to-inherit acceptance unit 23*b* adds together bonus values individually corresponding to one or more relationships between the game medium to raise and the raised game medium serving as the game medium to inherit and bonus values individually corresponding to relationships between the game medium to raise and the previous-generation raised game medium serving as an inheritance source, and displays the resulting value as a matching bonus value.

Each of the game-medium-to-inherit confirmation areas R42 is displayed so as to include an image Z1 and characteristic information of the raised game medium selected as the game medium to inherit, as well as images ZA1 and ZA2 and individual items of characteristic information of the previous-generation raised game media serving as inheritance sources for the game medium to inherit. In the example in FIG. 7, since two game media to inherit are selected, two game-medium-to-inherit confirmation areas R42 are displayed on the display device 13.

The OK button R43 is a button for setting the selected raised game medium as a game medium to inherit. The game-medium-to-inherit acceptance unit 23*b* sets the two selected raised game media as game media to inherit when the player has pressed the OK button R43.

The raising-game execution unit 23*c* is configured to include the processor 11. The raising-game execution unit 23*c* executes the raising game so as to modify raising parameters on the basis of one or more items of characteristic information included in game media to inherit and so as to generate a raised game medium by associating the character ID included in a game medium to raise with the raising parameters upon the completion of the raising game. In the case where the game media to inherit include a raised game medium associated with another player, the raising-game execution unit 23*c* executes the raising game so as to modify raising parameters that change in the course of the raising game, on the basis of one or more items of characteristic information included in the game medium to inherit associated with the other player, and so as to generate a raised game medium associated with the player on the basis of the raising parameters upon the completion of the raising game. In one example, the raising-game execution unit 23*c* executes the raising game by using a game medium to raise associated with the player as a game medium that is to be raised, modifies raising parameters that change in the course of the raising game, on the basis of one or more items of characteristic information included in the game medium to inherit associated with the other player, and generates a raised game medium by associating the character ID and raising parameters included in the game medium to raise with the player upon the completion of the raising game. In another example, regardless of the presence of a game medium to raise, the raising-game execution unit 23*c* executes the raising game so as to modify raising parameters that change in the course of the raising game, on the basis of one or more items of characteristic information included in the game medium to inherit associated with another player, and generates a raised game medium associated with the player on the basis of the raising parameters upon the completion of the raising game. The raised game medium generated by the raising-game execution unit 23*c* in the manner described above can be set as a game medium that is used in the first main competition game, and can also be set as a game medium that is added to the raised game medium group.

The raising game is a game of raising a game medium to raise, in which raising parameters associated with the game medium to raise, indicating abilities, skills, etc., are modified through training of the game medium to raise or inheritance based on characteristic information of game media to inherit. The raising game has associated therewith raising parameters associated with the game medium to raise, more specifically, with the character ID included in the game medium to raise. In the raising game, a consumption-type parameter associated with the game medium to raise, more specifically, with the character ID included in the game medium to raise, may be provided. The consumption-type parameter is a value that is used and consumed by the player during the raising game and that is effective only within the raising game. In one example, with the consumption-type parameter, in the case where there is an ability or skill that can be acquired for prescribed points through training or the like in the raising game, by consuming the consumption-type parameter, prescribed points necessary for the acquisition of the ability or skill are discounted or decreased. In another example, the consumption-type parameter is physical energy of the game medium to raise, more specifically, the character identified by the character ID included in the game medium to raise, in the raising game. The consumption-type parameter indicating physical energy is decreased through training in the raising game. Since the consumption-type parameter is a variable that changes in the course of the raising game, the consumption-type parameter can be considered as a type of raising parameter. That is, the consumption-type parameter may be associated, as a prescribed value, with at least one item of characteristic information of a material game medium, a raised game medium, or a game medium to inherit.

Figure 10:
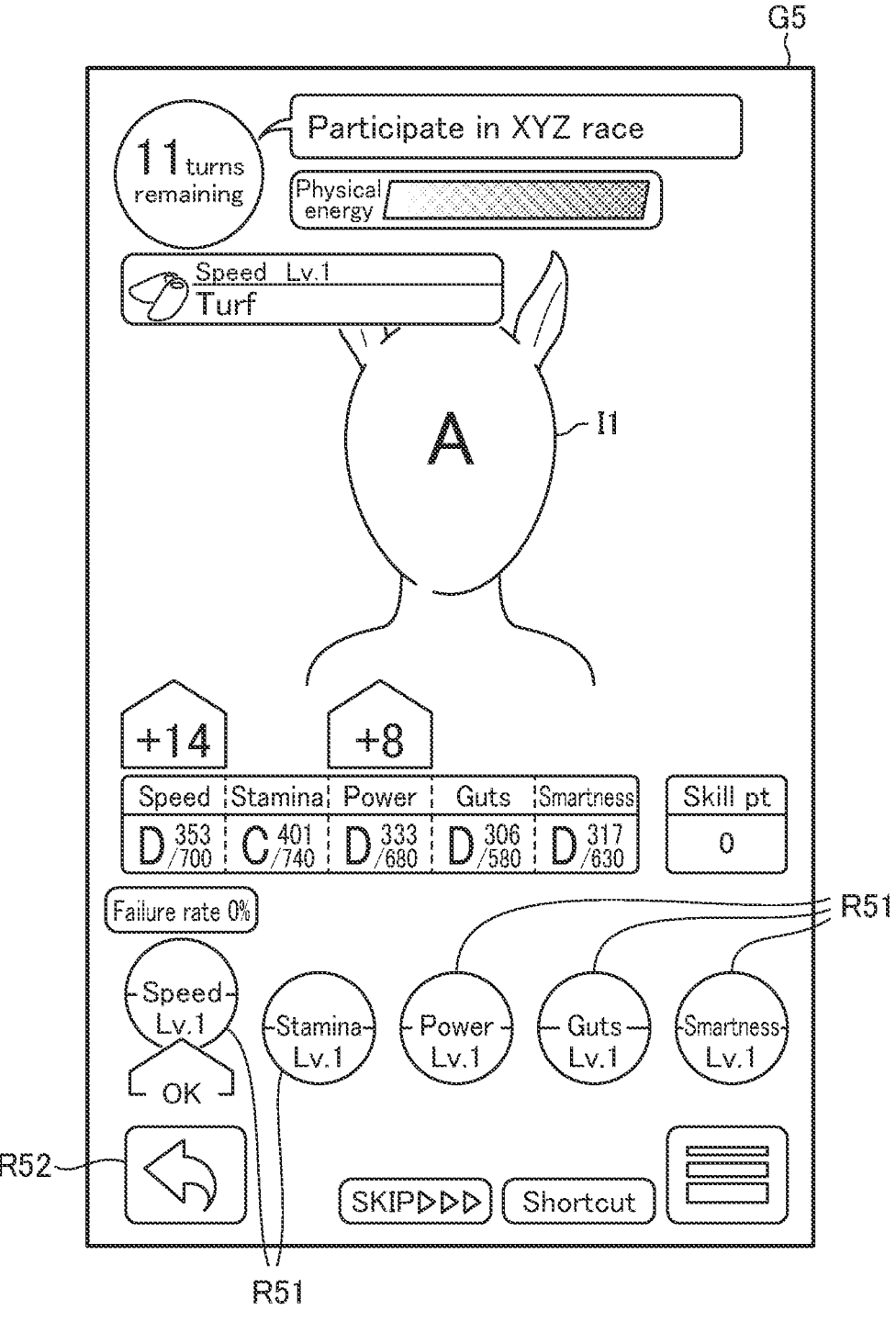
FIG. 10 shows a training-command selection screen for training a game medium to raise in a raising game.

FIG. 10 is a training-command selection screen for training a game medium to raise in the raising game. A training-command selection screen G5 is a screen that the raising-game execution unit 23*c* causes the display device 13 to display for the purpose of training a game medium to raise. The training-command selection screen G5 is displayed as a result of a transition from a home screen, which is not shown, when the raising-game execution unit 23*c* has received a signal indicating that the player has pressed a training button in the home screen. In the training-command selection screen G5, an image I1 of the game medium to raise, raising parameters, training command buttons R51, and a back button R52 are displayed. As the raising parameters, basic ability parameters indicating speed, stamina, power, guts, and smartness, skill points (skill pt) that are used to acquire skills, and a consumption-type parameter indicating the physical energy of the game medium to raise are individually displayed.

The training command buttons R51 here are buttons for increasing raising parameters corresponding to basic ability parameters. In one example, when the player has pressed one of the training command buttons R51, the raising parameter of the same kind as the pressed button R51 is increased. For example, when the training command button R51 for speed has been pressed, the raising parameter indicating speed is increased by a prescribed amount. Furthermore, two or more raising parameters may be increased for a single training command button R51. For example, in the example shown in FIG. 10, with the training command button R51 for speed, raising parameters indicating speed and power are increased by prescribed amounts of +14 and +8. In response to pressing of one of the training command buttons R51, a consumption-type parameter may be modified, such as decreasing the consumption-type parameter indicating physical energy or increasing a consumption-type parameter indicating a skill. The failure rate of training, shown in FIG. 10, is determined by the raising-game execution unit 23*c* depending on the consumption-type parameter indicating physical energy. In one example, the failure rate decreases as the value of the consumption-type parameter indicating physical energy increases, which makes it more likely to achieve a prescribed amount of change; meanwhile, the failure rate increases as the value of the parameter decreases, which makes it less likely to achieve a prescribed amount of change. The consumption-type parameter indicating physical energy can be recovered when a rest is taken for the game medium to raise. Training in the raising game can be performed a prescribed number of times (e.g., once) during a prescribed period (e.g., one turn) in the scenario of the raising game. The back button R52 is a button for returning to the home screen, with which the raising-game execution unit 23*c* causes a transition from the training-command selection screen G5 to the home screen.

Note that although the character ID and raising parameters of the game medium to raise are managed independently in this embodiment, the raising-game execution unit 23*c* can display an image I1 and raising parameters associated with the character ID individually in the training-command selection screen G5, which appears as if the character ID and the raising parameters were associated.

Figure 11:
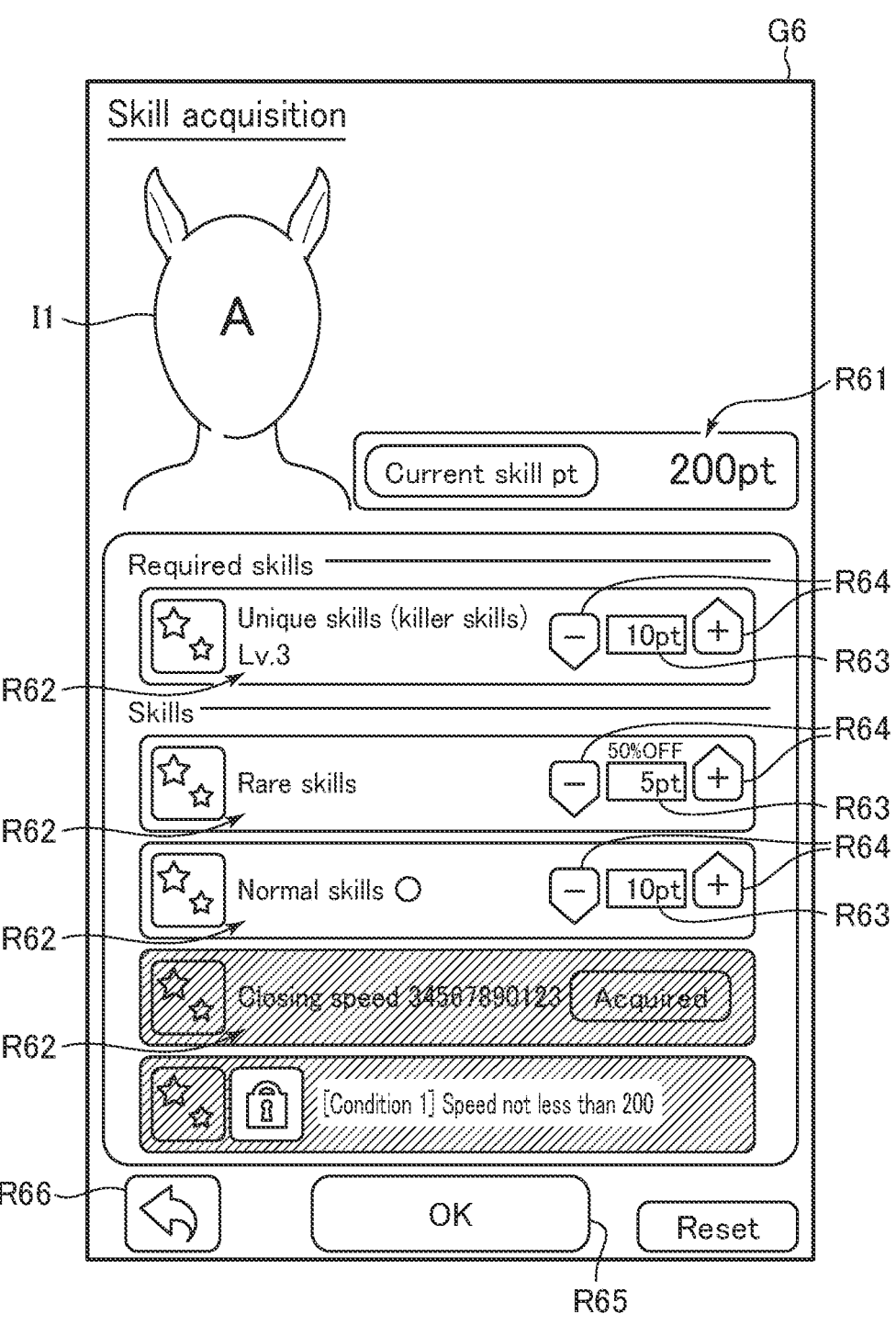
FIG. 11 shows a skill acquisition screen in the raising game.

FIG. 11 shows a skill acquisition screen in the raising game. A skill acquisition screen G6 is a screen for changing (increasing) a raising parameter indicating a skill, which is associated with the game medium to raise. The skill acquisition screen G6 is a screen that the raising-game execution unit 23*c* causes the display device 13 to display as a result of a transition from the home screen when the raising-game execution unit 23*c* has received a signal indicating that the player has pressed a skill acquisition button included in the home screen. In the skill acquisition screen G6, an image I1 of the game medium to raise, possessed skill points R61, skills R62 that can be acquired and that have already been acquired, skill points R63 to be used for acquisition or level advancement, buttons R64 for increasing and decreasing skill points that are used for a target skill, an OK button R65, and a back button R66 are displayed. Skill points to consume are selected by using the increasing and decreasing buttons R64, and the raising-game execution unit 23*c*, upon receiving a signal indicating that the OK button R65 has been pressed, changes the raising parameter indicating the relevant skill. The result of this change can be saved as one of the items of characteristic information of the raised game medium after the completion of the raising game. The back button 66 is a button for returning to the home screen when it is pressed by the player after the completion of skill acquisition.

The one or more items of characteristic information include fixed-expression-type information, with which the expression of an effect is already fixed when the raising game has been started, and lottery-type information, which becomes expressed as a result of a probability-based lottery that is executed at predetermined timings during the raising game. Expression refers to changing a raising parameter on the basis of the relevant characteristic information. Fixed-expression-type information is characteristic information having associated therewith a prescribed amount of change for changing the corresponding raising parameter, such as a basic ability parameter or a preference parameter. Lottery-type information is, for example, a race factor indicating an experience of winning in a prescribed race, or a skill factor indicating a prescribed skill. Lottery-type information may include characteristic information included in fixed-expression-type information, such as a basic ability parameter or a preference parameter. That is, a prescribed parameter may be both fixed-expression-type information and lottery-type information.

The one or more items of characteristic information included in a game medium to inherit may have a consumption-type parameter associated therewith, which is effective only within the raising game. A consumption-type parameter associated with the game medium to raise may be changed on the basis of the consumption-type parameter of the game medium to inherit. In one example, the consumption-type parameter indicating the physical energy of the game medium to raise (more specifically, of the character identified by the character ID included in the game medium to raise) can be recovered (increased) on the basis of the consumption-type parameter indicating the physical energy of a game medium to inherit. The consumption-type parameter may be one item of lottery-type information. In this case, the consumption-type parameter can be considered as a kind of raising parameter.

Figure 8:
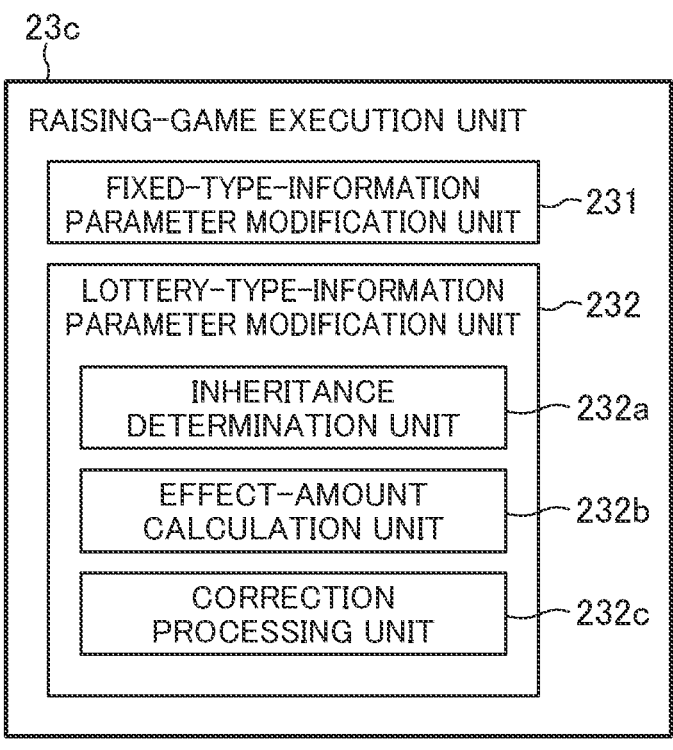
FIG. 8 shows an example functional block diagram of a raising-game execution unit.

FIG. 8 is an example functional block diagram of a raising-game execution unit. As shown in FIG. 8, the raising-game execution unit 23*c* includes a fixed-type-information parameter modification unit 231 and a lottery-type-information parameter modification unit 232.

The fixed-type-information parameter modification unit 231 modifies raising parameters corresponding to fixed-expression-type information of game media to inherit. In the case where the characteristic information indicating speed of a game medium to inherit is fixed-expression-type information, in one example, the fixed-type-information parameter modification unit 231 adds an effect amount (an amount of speed addition), determined on the basis of the parameter indicating speed of the game medium to inherit, to the raising parameter indicating speed. More specifically, the storage device 14 prestores a table in which ranks such as rarities are associated with prescribed values for each kind of fixed-type information (e.g., a table including a value of 3 for rank 1, a value of 5 for rank 2, and a value of 10 for rank 3), and the fixed-type-information parameter modification unit 231 adds the prescribed value corresponding to the rank of each item of fixed-type information of the game medium to inherit to the raising parameter corresponding to the fixed-type information.

Similarly, the fixed-type-information parameter modification unit 231 modifies the raising parameters corresponding to fixed-expression-type information of the individual previous-generation raised game media serving as inheritance sources for the game media to inherit. In this embodiment, for each item of fixed-type information, the amount that is added to the raising parameter corresponding to the fixed-type information is the sum of the individual prescribed values associated with the ranks of the corresponding fixed-type information of the game media to inherit and the individual prescribed values associated with the ranks of the corresponding fixed-type information of the previous-generation raised game media. In this embodiment, two game media to inherit and four previous-generation raised game media are associated with a game medium to raise, and thus the amount of addition is the sum of six prescribed values.

The parameter modification by the fixed-type-information parameter modification unit 231 may be performed at the start of the raising game, at prescribed timings during the proceeding of the raising game, or between the timing when game media to inherit have been determined and the timing when the raising game has been completed.

The lottery-type-information parameter modification unit 232 modifies raising parameters corresponding to individual items of lottery-type information on the basis of the results of probability-based lotteries. Specifically, the lottery-type-information parameter modification unit 232 includes an inheritance determination unit 232*a*, an effect-amount calculation unit 232*b*, and a correction processing unit 232*c*.

The inheritance determination unit 232*a*, for each item of lottery-type information, determines whether or not to modify the raising parameter corresponding to the item of lottery-type information on the basis of the probability of expression corresponding to the item of lottery-type information. In one example, the inheritance determination unit 232*a* determines whether or not an item of lottery-type information of a game medium to inherit will be inherited by the game medium to raise on the basis of the probability of expression associated with the item of lottery-type information of the game medium to inherit. Inheritance here refers to the modification of the raising parameter corresponding to an item of lottery-type information of a game medium to inherit. That is, it is determined that the raising parameter corresponding to the item of lottery-type information is to be changed in the case where the item of lottery-type information is expressed on the basis of the probability of expression, and it is determined that the raising parameter corresponding to the item of lottery-type information is not to be changed in the case where the item of lottery-type information is not expressed on the basis of the probability of expression. The probabilities of expression can be preset, for example, for the individual ranks of each item of lottery-type information (e.g., the probabilities of expression of a kind of basic ability parameter can be set as 30% for rank 1, 40% for rank 2, and 50% for rank 3). These settings can be prestored in the storage device 14 in the form of a table. Furthermore, the probabilities of expression can also be set for the individual kinds of lottery-type information.

The effect-amount calculation unit 232*b* calculates an effect amount corresponding to an item of lottery-type information for which it has been determined through a lottery in the inheritance determination unit 232*a* that the raising parameter is to be modified. In this embodiment, this effect amount is determined on the basis of a weight for the effect amount. Weights for the effect amount are information that is expressed on the basis of a horizontal axis indicating the effect amount (e.g., 1, 2, 3, etc.) and a vertical axis indicating the probability, and in one example, the weights for the effect amount are defined by a probability distribution in which probabilities are assigned to individual effect amounts. The weights for the effect amount may be weights corresponding to the ranks of each item of lottery-type information, as shown in Table 1. Table 1 shows the weights for the effect amount concerning basic abilities serving as items of lottery-type information. The numerical values of weights given in Table 1 are relative values. For example, in the case of rank 1, the weights are defined such that the effect amount is most likely to become 1 and is least likely to become 10. The weights for the effect amount are prestored in the storage device 14, and the effect-amount calculation unit 232*b* individually identifies the items of lottery-type information associated with game media to inherit, as well as the ranks thereof, reads out the weights for the identified ranks of the items of lottery-type information from the storage device 14, and individually calculates the effect amounts therefor. Furthermore, the effect-amount calculation unit 232*b* adds the effect amounts calculated for the individual items of lottery-type information to the corresponding raising parameters.

TABLE 1

| Kind of lottery-type information | Effect amount | Weights | | |
| --- | --- | --- | --- | --- |
| | | Rank 1 | Rank 2 | Rank 3 |
| Basic abilities | 1 | 100 | 60 | 10 |
| | 2 | 90 | 70 | 20 |

TABLE 1-continued

| Kind of lottery-type information | Effect amount | Weights | | |
|---|---|---|---|---|
| | | Rank 1 | Rank 2 | Rank 3 |
| | 3 | 80 | 80 | 30 |
| | 4 | 70 | 90 | 40 |
| | 5 | 60 | 100 | 60 |
| | 6 | 50 | 80 | 80 |
| | 7 | 40 | 70 | 90 |
| | 8 | 30 | 50 | 100 |
| | 9 | 20 | 30 | 50 |
| | 10 | 10 | 20 | 30 |

The correction processing unit 232*c* corrects the probabilities of expression corresponding to items of lottery-type information on the basis of the matching between the game medium to raise and the game media to inherit. This matching refers to relationships between the game medium to raise and the game media to inherit, and includes one or more relationships. Each relationship has set therefor a prescribed matching bonus value. For each item of lottery-type information, the correction processing unit 232*c* multiplies the preset probability of expression of the item of lottery-type information by a weight coefficient reflecting the matching bonus value, i.e., (1+the sum of the matching bonus values of the individual relationships of the item of lottery-type information/100). The value obtained in this manner is used by the lottery-type-information parameter modification unit 232 (the inheritance determination unit 232*a*) as the probability of expression of the item of lottery-type information.

Although the relationships depend on the scenario and the world view of the raising game, examples of relationships between the game medium to raise and the game media to inherit include colleagues, rivals, and those that won the same race. The matching bonus value for each relationship can be set as appropriate, and may be either a positive value or a negative value. The relationships between the game medium to raise and the game media to inherit, as well as the matching bonus values for the individual relationships, are prestored in the storage device 14 such that the IDs of the individual game media constituting the relationships are associated with the matching bonus values, and the correction processing unit 232*c* can read out various kinds of information as needed from the storage device 14.

The raising-game execution unit 23*c*, on the basis of the matching between the game medium to raise and the individual previous-generation raised game media serving as inheritance sources for the individual game media to inherit therefor, may correct the probabilities of expression corresponding to items of lottery-type information of the raised game medium. The matching between the game medium to raise and the previous-generation raised game media includes one or more relationships. Each relationship has set therefor a prescribed matching bonus value. For each item of lottery-type information of the previous-generation raised game media, the raising-game execution unit 23*c* multiplies the preset probability of expression of the item of lottery-type information by a weight coefficient reflecting the matching bonus value, i.e., (1+the sum of the matching bonus values of the individual relationships of the item of lottery-type information/100). The value obtained in this manner is used as the probability of expression of the item of lottery-type information by the lottery-type-information parameter modification unit 232 (the inheritance determination unit 232*a*), which makes it possible to reflect the characteristic information of the previous-generation raised game media as well as the game media to inherit in changes of the raising parameters.

In one example, in the case where characteristics indicating speed constitute one item of lottery-type information, the raising-game execution unit 23*c*, by means of the lottery-type-information parameter modification unit 232, modifies the raising parameter indicating speed on the basis of the items of lottery-type information indicating speed of the individual game media to inherit, and also modifies the raising parameter indicating speed on the basis of the items of lottery-type information indicating speed of the previous-generation raised game media.

The raised-game-medium addition unit 23*d* is configured to include the processor 11. The raised-game-medium addition unit 23*d* adds a raised game medium that has been raised by the raising-game execution unit 23*c* in the raising game, as a raised game medium associated with the player, to the raised game medium group. That is, the raised-game-medium addition unit 23*d* adds the raised game medium generated upon the completion of the raising game in the raising-game execution unit 23*c* to the raised game medium group. The raised game medium here is stored in the storage device 14 such that a unique ID of a kind different from the IDs of the material game medium and the game medium to raise, the same character ID as that of the material game medium selected by the player, and the characteristic information indicated by the raising parameter values at the timing of the completion of the raising game are associated with each other by the raising-game execution unit 23*c*.

In one example, the raised-game-medium addition unit 23*d* adds a raised game medium generated as a result of the completion of the n-th play of the raising game to the raised game medium group so that the raised game medium can be set as a game medium to inherit in the (n+1)-th and subsequent plays of the raising game. This makes it possible to include a raised game medium raised in one play of the raising game as a candidate for a game medium to inherit in the next or subsequent play of the raising game, and to include the raised game medium as a candidate of a game medium to use in the first main competition game and/or the second main competition game.

Figure 9:
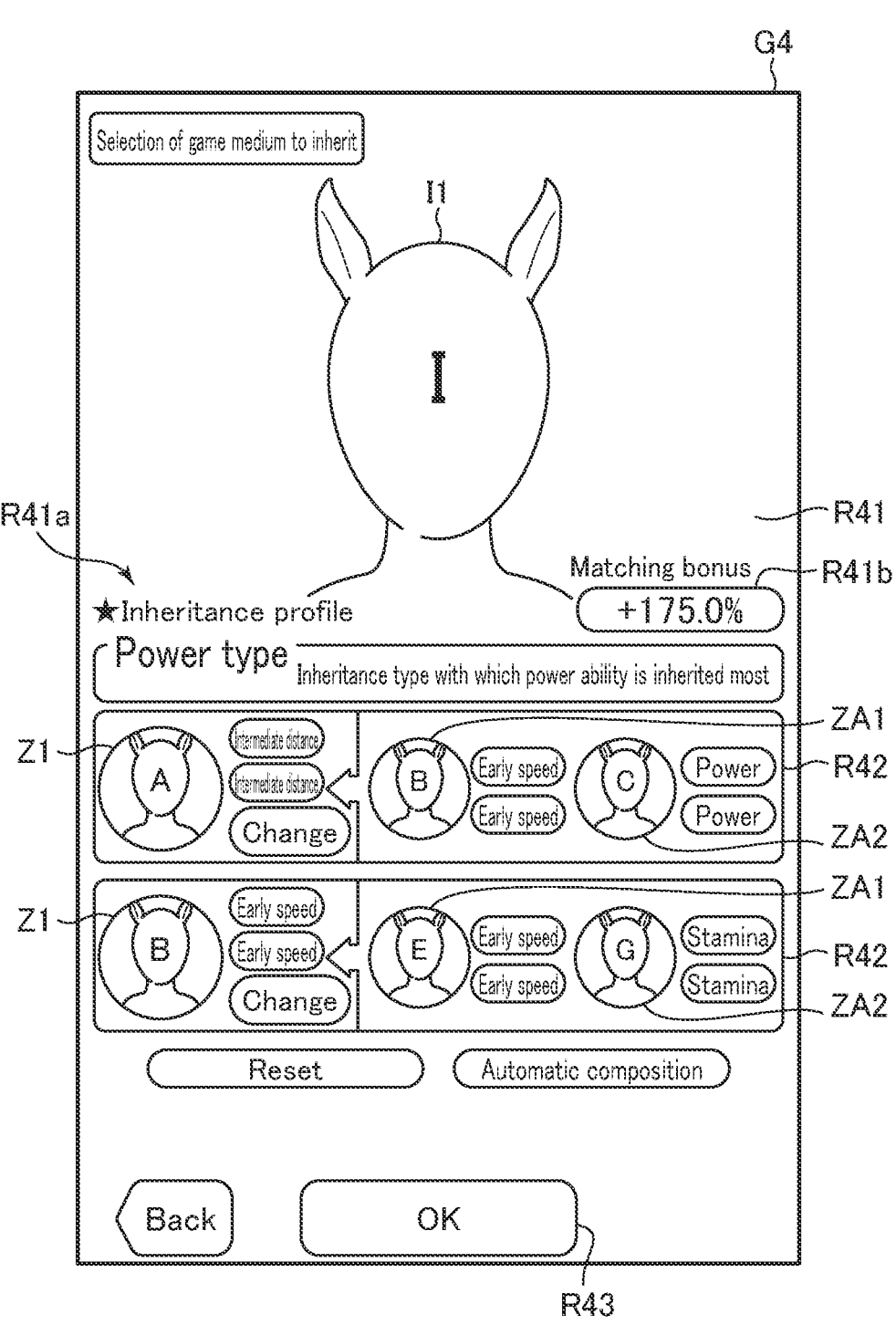
FIG. 9 shows another example game-medium-to-inherit confirmation screen.

FIG. 9 shows another example game-medium-to-inherit confirmation screen. In FIG. 9, a raised game medium (character A) that has been raised by using the game medium to raise shown in FIG. 7 as a base is set as a game medium to inherit. That is, FIG. 9 shows that the game medium to raise that has been raised in the raising game in FIG. 7 (i.e., the raised game medium (character A)) is set in the upper game-medium-to-inherit confirmation area R42 of the two shown as vertically arrayed in FIG. 9, as a game medium to inherit in the raising game in FIG. 9.

The other-player's-raised-game-medium addition unit 23*e* is configured to include the processor 11, and adds a raised game medium associated with another player to the raised game medium group as a raised game medium associated with the player. The raised game medium associated with the other player is a game medium that has been raised by the other player in the raising game, e.g., a game medium that has been raised at the information processing device 10 possessed by the other player. The other-player's-raised-game-medium addition unit 23*e* obtains the raised game medium raised by the other player via the communication device 15, and stores the obtained raised game medium as one in his or her own raised game medium group, thereby adding the raised game medium in the raised game medium group. In one example, in the case where the other player belongs to a group such as a circle that the player belongs in the game, the other-player's-raised-game-medium addition unit 23e adds the raised game medium associated with the other player in the raised game medium group (e.g., the other-player's raised game medium group) in association with the player (e.g., the player ID). In another example, by using a chat function of the game control unit 23, information posted on the chat, such as the player ID of another player and the character ID of a raised game medium associated with the other player, is shared with the player, and the other-player's-raised-game-medium addition unit 23e adds the raised game medium to the raised game medium group (e.g., the other-player's raised game medium group) in association with the player (e.g., the player ID). The addition of the raised game medium associated with the other player can be performed by copying the raised game medium into the storage device 14 or by referring to the raised game medium. Alternatively, the other-player's-raised-game-medium addition unit 23e may add a raised game medium associated with another player to the raised game medium group through random copying or reference, which may be displayed in the game-medium-to-inherit selection screen G3 and/or the game-medium-to-use selection screen G7.

The first-main-competition-game execution unit 23f is configured to include the processor 11, and executes the first main competition game. The first main competition game is, for example, a race. In one example, the first-main-competition-game execution unit 23f uses a raised game medium in the first main competition game, the raised game medium being selected by the player via the input unit 12 from the raised game medium group associated with the player, and executes the first main competition game on the basis of the raised game medium. The first-main-competition-game execution unit 23f causes the display device 13 to display the process and result of the execution of the first main competition game. The first-main-competition-game execution unit 23f may give a reward to the player and/or the raised game medium associated with the player, having participated in the first main competition game, on the basis of the place of the raised game medium. The reward may be, for example, an evaluation score of the player and/or the raised game medium, a virtual currency or an item that can be used in the game, or the like.

The second-main-competition-game execution unit 23g is configured to include the processor 11, and executes the second main competition game. The second main competition game is, for example, a race. In one example, the second-main-competition-game execution unit 23g uses a raised game medium in the second main competition game, the raised game medium being selected by the player via the input unit 12 from the raised game medium group associated with another player, and executes the second main competition game on the basis of the raised game medium. The second-main-competition-game execution unit 23g causes the display device 13 to display the process and result of the execution of the second main competition game. The second-main-competition-game execution unit 23g may cause the display device 13 to display a race-condition setting screen (not shown) and may accept the setting of race conditions of the second main competition game by the player via the screen. The conditions may include a race track in a virtual space, a race distance, the weather, the season, the number of participants, motivation, and the strength of NPCs. As opposed to the first-main-competition-game execution unit 23f, the second-main-competitiongame execution unit 23g need not give a reward to the player and/or the raised game medium.

The first main competition game and the second main competition game are race games in which a raised game medium selected by the player participates, and share a basic program. Meanwhile, the first main competition game and the second main competition game may involve different raised game media selected by the player. Specifically, in the first main competition game, the participants that the player can select are only raised game media associated with the player (more specifically, raised game media raised by the player in the raising game). Meanwhile, in the second main competition game, the participants that the player can select are raised game media associated with the player (more specifically, raised game media raised by the player in the raising game) or raised game media associated with other players (more specifically, raised game media raised by other players in the raising game). The other participants may be non-player characters (NPCs), which are optional.

The second main competition game may be a simulation race for the first main competition game, which allows the player to evaluate features of a raised game medium associated with another player, such as characteristic information and convenience, through an actual main competition game and/or the result of the execution thereof, in determining whether or not to select the raised game medium associated with the other player as a game medium to inherit. That is, the second main competition game can simulate the first main competition game through the setting of race conditions. Furthermore, since the second main competition game can simulate the first main competition game, the second main competition game can serve as an occasion for checking the performance of a raised game medium raised by the player, and can serve as a resource for determining future raising policies. Note that the raised game medium raised by the player may be a raised game medium that has inherited a raised game medium of the player or a raised game medium that has inherited a raised game medium of another player. The results of these types of inheritance can be checked in the second main competition game.

The game-medium-to-use setting unit 23h is configured to include the processor 11 and the input unit 12, and sets a raised game medium to use in the first main competition game or the second main competition game. In one example, the game-medium-to-use setting unit 23h sets a raised game medium that is used in the first main competition game (a raised game medium associated with the player) or a raised game medium that is used in the second main competition game (a raised game medium associated with another player), through selection by the player via the input unit 12. Specifically, when the player executes the first main competition game or the second main competition game, the game-medium-to-use setting unit 23h causes the display device 13 to display a first-main-competition-game game-medium-to-use setting screen (not shown) or a second-main-competition-game game-medium-to-use setting screen (e.g., see FIG. 12), accepts a selection by the player via each screen and the input unit 12, and sets the accepted raised game medium as a raised game medium that is to participate in each game. Note that in the game-medium-to-use setting unit 23h, as opposed to the setting of a game medium to inherit in the raising game, no rental fee is imposed on the selection of a raised game medium to use in the second main competition game. In another example, a rental fee that is lower than the rental fee for the setting of a game medium to inherit may be imposed.

Figure 12:
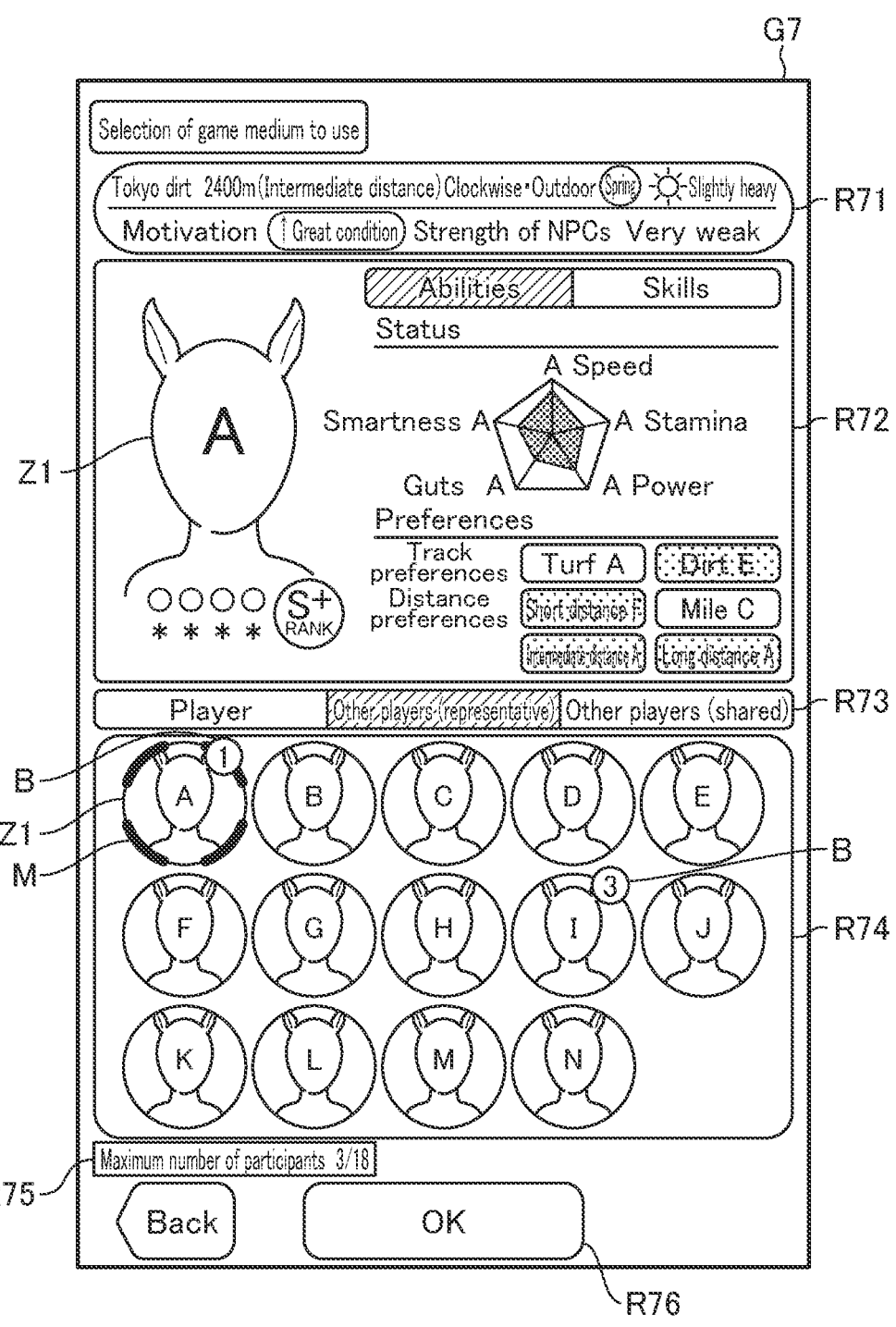
FIG. 12 shows an example game-medium-to-use selection screen.

FIG. 12 shows an example game-medium-to-use selection screen. The game-medium-to-use selection screen G7 shown in FIG. 12 is a screen for accepting the selection of a raised game medium to use in the second main competition game. The game-medium-to-use selection screen G7 is displayed so as to include a race-information display area R71, a selected-raised-game-medium display area R72, a switching-tab display area R73, a game-medium-to-use-candidate display area R74, a selected-number display area R75, and an OK button R76.

In the race-information display area R71, race condition information for the second main competition game, set by the player via the second-main-competition-game execution unit 23g, is displayed. The race condition information may include a race track, a race distance, the weather in the virtual space, the season, the number of participants, motivation, the strength of NPCs, etc.

The selected-raised-game-medium display area R72 is displayed so as to include an image Z1 and characteristic information of a raised game medium selected by the player and having a mark M attached thereto in the game-medium-to-use-candidate display area R74. Examples of the characteristic information include basic ability parameters indicating speed, stamina, power, guts, and smartness, as well as preference parameters including track preferences, distance preferences, and running-style preferences. The track preferences include, for example, preferences concerning turf and preferences concerning dirt. The distance characteristics include, for example, short-distance characteristics, mile characteristics, intermediate-distance characteristics, and long-distance characteristics. The running-style characteristics include early speed characteristics, front running characteristics, stretch running characteristics, and closing characteristics. The individual parameters are, for example, numerical values. As one example, together with numerical values, ranks or levels may be displayed in the form of ABC indications or the like in accordance with differences in the values. For example, rank A indicates the highest preference, and the preference becomes lower as the rank becomes remoter from rank A. In one example, a trait of high speed is indicated in the case where the speed parameter is indicated as rank A, and a trait of low speed is indicated in the case where the speed parameter is indicated as rank G.

In the game-medium-to-use-candidate display area R74, a plurality of raised game media (e.g., images Z1 thereof) serving as candidates for use in the second main competition game are displayed. That is, the raised game media displayed are raised game media included in the raised game medium group. In this embodiment, since the display device 13 and the input unit 12 are implemented by the touchscreen of the information processing device 10, it is possible to accept the selection of one of the raised game media displayed in the game-medium-to-use-candidate display area R74, with a player's finger or the like. Through this selection, badge B is attached. Badge B is a mark indicating selection, and includes a numerical value indicating the order of selection. In the example shown in FIG. 12, badge B indicating the first selection and badge B indicating the third selection are displayed. Furthermore, the selection of a raised game medium is accepted in the form of a tap with a player's finger or the like, and the selection can be cancelled by another tap.

In the switching-tab display area R73, tabs for switching the raised game medium group displayed in the game-medium-to-use-candidate display area R74 are displayed. The switching-tab display area R73 the switching-tab display area R34 includes a player tab for selecting the displaying of the raised game medium group associated with the player and an other-players tabs for selecting the displaying of the raised game medium groups associated with other players. In the example shown in FIG. 12, as the other-players tabs, an other-players representative tab and an other-players shared tab may be included.

The other-players representative tab is a tab for selecting the displaying of a representative raised game medium group of other players. This raised game medium group includes representative raised game media (representative game media) associated with one or more other players. In the example shown in FIG. 12, representative game media of characters A to N are displayed. In one example, other players for whom representative game media are displayed may be players belonging to a common group such as a circle in the game, and information such as the character IDs of raised game media is shared via the group.

The other-players shared tab is a tab for selecting the displaying of a raised game medium group including, of raised game media associated with other players, raised game media for which information such as the character IDs of the raised game media is shared via a chat or the like in the game. This chat function is a function of the game control unit 23. The player can post information such as his or her player ID and the character IDs of his or her raised game media on the chat to share the raised game media with other players, and sharing vice versa is also possible. That is, players participating in the chat can share the information concerning the raised game media by copying or by reference on the basis of the posted information.

In the selected-number display area R75, the number of raised game media selected, as well as the maximum number of raised game media that can participate in the second main competition game, are displayed. In the example shown in FIG. 12, the number of raised game media currently selected is three, and the maximum number is 18. By displaying the number of selected raised game media and the maximum number of raised game media that can participate in the second main competition game, as described above, it becomes possible for the player to recognize the number of raised game media selected. Note that in the example shown in FIG. 12, badge B including the number 2 is not displayed in the game-medium-to-use-candidate display area R74, and this is because raised game media displayed when the player tab or the other-players shared tab is selected are selected. That is, by switching among the tabs, it is possible to recognize the current number of selection by the player with the indication in the selected-number display area R75.

The OK button R76 is a button for finalizing the selection of a raised game medium to use in the second main competition game. That is, the second main competition game is started when the OK button R76 has been pressed.

The inheritance-history-information creation unit 23i is configured to include the processor 11, and creates inheritance history information of raised game media associated with the player and selected by other players via the game-medium-to-inherit acceptance unit 23b. The inheritance history information may include an ID associated with a raised game medium selected as a game medium to inherit, the player ID of another player who selected the raised game medium, the ID associated with a game medium to raise of the other player, which inherited the game medium to inherit, and time information concerning inheritance. It is possible to identify the individual raised game media, game media to raise, and names of other players from these IDs. Furthermore, in the case where a relevant other player belongs to the same group in the game as the player, the inheritance history information may include the ID and the name of the group. The time information concerning inheritance may be the date and time of the completion of the raising game in which the raised game medium (e.g., the representative game medium) of the player was selected by the other player as a game medium to inherit, the date and time when the other player selected the raised game medium (e.g., the representative game medium) of the player as a game medium to inherit, or the like.

In one example, upon the completion of the raising game in which a raised game medium (e.g., the representative game medium) of the player was selected by another player as a game medium to inherit, the inheritance-history-information creation unit 23*i* creates inheritance history information by associating the date and time of the completion, the ID and character name associated with the raised game medium, the ID and character name associated with a raised game medium of the other player, which inherited the raised game medium, and the ID of the other player, and stores the inheritance history information in the storage device 14. This creation and storage is performed each time a raised game medium of the player is selected as a game medium to inherit in the raising game for another player and the raising game is completed. Thus, the inheritance history information may be time-series information.

FIG. 13 shows an example raised-game-medium detail screen. A raised-game-medium detail screen G8 is a screen for displaying information concerning a raised game medium, including inheritance history information. The raised-game-medium detail screen G8 is displayed so as to include a selected-raised-game-medium display area R81, a switching-tab display area R82, a tab-related-information display area R83, and a close button R84.

The close button R84 is a button for returning to the screen before a transition to the raised-game-medium detail screen G8. In other words, the raised-game-medium detail screen G8 is a screen that is displayed as a result of transition in the case where a raised game medium in the raised-game-medium-group display area (e.g., the raised-game-medium-group display area R33 or the game-medium-to-use-candidate display area R74) is selected, by holding or the like, in a screen in which a raised game medium group is displayed (e.g., the game-medium-to-inherit selection screen G3 or the game-medium-to-use selection screen G7). Alternatively, the raised-game-medium detail screen G8 may be a screen that is displayed as a result of transition from a screen displaying the raised game medium group of the player, which is displayed as a transition when a button for a list of raised game media of the player, displayed in the home screen, has been pressed. The raised-game-medium detailed screen G8 may be displayed as a result of transition via a profile screen, which will be described later. These transitions are executed when one of the raised game media displayed in the previous screen is held or otherwise operated.

In the selected-raised-game-medium display area R81, overview information of the raised game medium selected in the previous screen is displayed. The overview information is displayed so as to include the name, the image Z1, the rank, the evaluation score, the number of races won, and the "registration date", which is the date of the completion of raising, of the raised game medium. The evaluation score is a score that is assigned depending on the ability of the raised game medium at the completion of the raising game.

In the switching-tab display area R82, tabs for switching the information that is displayed in the tab-related-information display area R83 are displayed. In the example shown in FIG. 13, the tabs include a status tab, a skill tab, a raising information tab, and an inheritance history tab.

The status tab is a tab for displaying the status of the selected raised game medium in the tab-related-information display area R83. For example, the status is characteristic information including basic ability parameters indicating speed, stamina, power, guts, and smartness, preference parameters including track preferences, distance preferences, and running-style preferences, etc.

The skill tab is a tab for displaying skills possessed by the selected raised game medium in the tab-related-information display area R83. The raising-information tab is a tab for displaying raising information of the selected raised game medium in the tab-related-information display area R83. The raising information may include a genealogy of the raised game medium, a record indicating the cumulative number of races won, the number of fans acquired, titles won in important races among the raising game or the first or second main competition game, the date of the completion of raising of the raised game medium, etc. The genealogy of the raised game medium may include information concerning the game media to inherit that were used when the raised game medium was raised in the raising game. The number of fans acquired is the total number of fans acquired depending on places in the first main competition game and/or the second main competition game in which the raised game medium participated.

The inheritance history tab is a tab for displaying inheritance history information of the selected raised game medium in the tab-related-information display area R83. The inheritance history information may include player inheritance information indicating that the selected raised game medium was selected by the player as a game medium to inherit, other-player inheritance history indicating that the selected raised game medium was selected by another player as a game medium to inherit, and the number of inheritances indicating the total number of selections as these game media to inherit. The player inheritance history may include the name of the game medium to raise that inherited the selected raised game medium, as well as time information concerning inheritance. The other-player inheritance history may include the name of the game medium to raise that inherited the selected raised game medium, the name of the other player, the name of the group to which the other player belongs, and time information concerning inheritance. In the example shown in FIG. 13, the number of inheritances, the player history information, and the other-player history information are displayed in the form of text information.

The tab-related-information display area R83 is an area for displaying information corresponding to one of the tabs in the switching-tab display area R82.

The representative-game-medium setting unit 23*j* is configured to include the processor 11, and each player selects and set a representative raised game medium among raised game media associated with the player. That is, the representative-game-medium setting unit 23*j* sets at least one of the raised game media associated with a player or another player as a representative game medium associated with the player or the other player. Each player can set a representative game medium arbitrarily; for example, each player can set a raised game medium for which the player had a deep attachment in the raising game or a raised game medium that the player can proudly show to other players.

Figure 14:
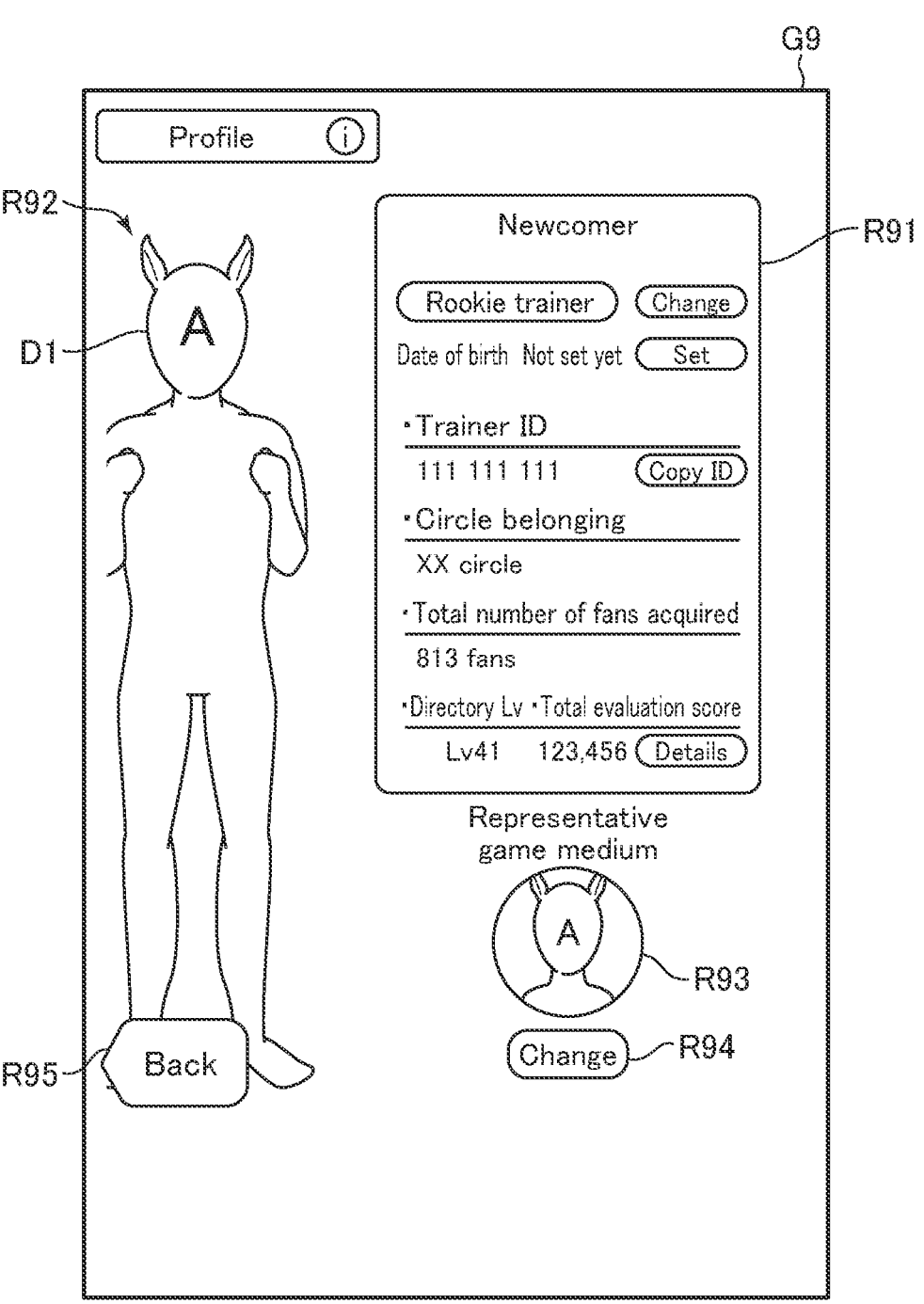
FIG. 14 shows an example player profile screen.

FIG. 14 is an example player profile screen. A profile screen G9 is displayed so as to include a player-information display area R91, a representative-game-medium-image display area R92, a representative-game-medium display area R93, a representative-game-medium change button R94, and a back button R95.

In the player-information display area R91, player information including the name in the game, a title, the date of birth, a trainer ID serving as a player ID, a circle name, the total number of fans acquired, a level, and a total evaluation score of the player is displayed. The title is given, for example, depending on the level of the player. The circle name is the name of a group to which the player belongs in the game. The total number of fans acquired is the total number of fans acquired by raised game media raised by the player on the basis of places in the first main competition game and the second main competition game. The total evaluation score is the sum of the top n (e.g., n is 3) evaluation scores among those given to the raised game media of the player.

In the representative-game-medium-image display area R92, an entire image Dl of the representative game medium set in the representative-game-medium display area R93 is displayed. In the representative-game-medium display area R93, an image of the representative game medium that has been set is displayed. The representative-game-medium change button R94 is a button for accepting a change in the representative game medium. When the representative-game-medium change button R94 has been pressed, a transition occurs to a list display screen (not shown) for the raised game medium group associated with the player. In the list display screen, a plurality of raised game media associated with the player are displayed, the selection of one of the raised game media is accepted, and the representative game medium is changed to the raised game medium. By holding or otherwise operating one of the raised game media in the list display screen, it is possible to display the raised-game-medium display screen G8, which makes it possible to browse detailed information concerning the raised game medium. The back button R95 is a button for returning to the screen before a transition to the profile screen G9. In one example, the previous screen may be the home screen.

Note that the setting of a representative game medium by the representative-game-medium setting unit 23*j* makes it possible to set, as the representative game medium, a raised game medium associated with the player and selectable by another player, and vice versa. That is, in the case where other players have set representative game media, the player can use the representative game media associated with other players as options for selecting a game medium to inherit or as a raised game medium to use in the second main competition game. This makes it possible to select raised game media specially selected by individual players as a game medium to inherit or as a raised game medium to use in the second main competition game. As a result, it is possible to advantageously proceed with the raising game compared with the case of using, as a game medium to inherit, a raised game medium of another player with low level, rank, or ability.

[Operations]

[Raising Game]

FIG. 15 shows an example operation flowchart, concerning the raising game, of the information processing device according to the embodiment of the present invention. Note that it is assumed for the purpose of description that at least two raised game media constituting the raised game medium group are prestored in the storage device 14. The raised game media may be those provided in advance in the system, those acquired from other players, or those raised by the player himself or herself by training a game medium to raise in the raising game. Here, the raised game medium group includes at least one raised game medium associated with another player.

The information processing device 10, by means of the game-medium-to-raise acceptance unit 23*a*, accepts the selection of a game medium to raise (S01). That is, the game-medium-to-raise acceptance unit 23*a* accepts, as a game medium to raise, a material game medium selected by the player from the material game medium group. Specifically, the game-medium-to-raise acceptance unit 23*a* causes the display device 13 to display the game-medium-to-raise selection screen G1, and accepts, via the input unit 12, the player's selection of one of the material game media displayed in the material-game-medium-group display area R12 in the game-medium-to-raise selection screen G1. The game-medium-to-raise acceptance unit 23*a* causes an image S1 of the selected material game medium, as well as characteristic information such as the basic ability parameters and preference parameters of the material game medium, to be displayed in the selected-material-game-medium display area R11. This makes it possible for the player to easily select a material game medium that is to be raised. Then, the game-medium-to-raise acceptance unit 23*a* receives a signal indicating that the OK button R13 has been pressed by the player via the input unit 12, and accepts the selected one material game medium as a game medium to raise.

Then, the game-medium-to-inherit acceptance unit 23*b* accepts the selection of a game medium to inherit by the player (S02). Here, it is possible to accept the player's selection by using at least one raised game medium associated with another player as a game medium to inherit. Specifically, the game-medium-to-inherit acceptance unit 23*b* first receives a signal indicating that a game medium to raise has been accepted by the game-medium-to-raise acceptance unit 23*a*, causes the display device 13 to display the game-medium-to-inherit pre-selection screen G2 shown in FIG. 5, and accepts the pressing of the add button 24 in the game-medium-to-inherit selection area R22 via the input unit 12. Then, the game-medium-to-inherit acceptance unit 23*b* causes the display device 13 to display the game-medium-to-inherit selection screen G3 shown in FIG. 6, and accepts the selection of one of the raised game media displayed in the raised-game-medium-group display area R33 in the game-medium-to-inherit selection screen G3. At this time, by selecting the other-players tab, the player can cause raised game medium groups associated with other players to be displayed in the raised-game-medium-group display area R22 and can select a raised game medium of another player from thereamong. The game-medium-to-inherit acceptance unit 23*b* causes an image A1 and characteristic information of the selected game medium to inherit, as well as images ZA1 and ZA2 and individual items of characteristic information of the previous-generation raised game media serving as inheritance sources for the game medium to inherit, to be displayed in the game-medium-to-inherit tentative selection area R32, and cause an image I1 and characteristic information of the game medium to raise in the game-medium-to-raise display area R31. This makes it possible for the player to compare characteristic information between the game medium to raise and the game medium to inherit, which makes it possible for the player to easily select a game medium to inherit in relation to a game medium to raise. Furthermore, by holding or otherwise operating a raised game medium in the raised-game-medium-group display area R33, the raised-game-medium detail screen G8 may be displayed. This makes it possible for the player to check detailed information and to easily select a game medium to inherit. Then, in response to the pressing of the OK button R37 via the input unit 12, the game-medium-to-inherit acceptance unit 23b accepts the raised game medium selected by the player as a game medium to inherit.

In the raising game in this embodiment, two game media to inherit are set. Thus, after accepting the selection of a first game medium to inherit, the game-medium-to-inherit acceptance unit 23b again causes the display device 13 to display the game-medium-to-inherit pre-selection screen G2. At this time, however, in one of the game-medium-to-inherit selection areas R22 in the game-medium-to-inherit pre-selection screen G2, an image and characteristic information of the selected game medium to inherit are displayed, similarly to the displaying in the game-medium-to-inherit tentative selection area R32. Similarly to the selected game medium to inherit, the game-medium-to-inherit acceptance unit 23b accepts the selection of another game medium to inherit. Thus, in both of the game-medium-to-inherit selection areas R22 in the game-medium-to-inherit pre-selection screen G2 in FIG. 5, the images, characteristic information, etc. of the selected game media to inherit are individually displayed. In response to the pressing of the OK button R23, the game-medium-to-inherit acceptance unit 23b causes the display device 13 to display the game-medium-to-inherit confirmation screen G4 shown in FIG. 7.

The game-medium-to-inherit acceptance unit 23b can accept a change in the selection of game media to inherit. In the case where one of the game media to inherit is to be changed, changing or resetting can be performed by pressing a change button in the game-medium-to-inherit confirmation area R42, and in the case where both of the game media to be inherited are to be changed, changing or resetting can be performed by pressing a reset button displayed in the game-medium-to-inherit confirmation screen G4. In these cases, the selection of game media to inherit is performed again, starting from the game-medium-to-inherit pre-selection screen G2 or the game-medium-to-inherit selection screen G3. In this embodiment, at least one of the game media to inherit is a raised gamed medium associated with another player.

In the case where none of the game media to inherit are to be changed, the game-medium-to-inherit acceptance unit 23b receives a signal indicating that the player has pressed the OK button 43 in the game-medium-to-inherit confirmation screen G4 via the input unit 12, and accepts the selected raised game media as game media to inherit.

After the game medium to raise and the game media to inherit are selected, the raising-game execution unit 23c starts the raising game (S03). The raising-game execution unit 23c raises the game medium to raise according to a prescribed scenario. Upon the start of the raising game, the fixed-type-information parameter modification unit 231 modifies raising parameters, corresponding to fixed-expression-type information, of the game media to inherit and the previous-generation raised game media (S04). In this embodiment, for each kind of fixed-type information, the fixed-type-information parameter modification unit 231 adds together the predetermined, prescribed values corresponding to the ranks of the items of fixed-expression-type information of the individual game media to inherit and the individual previous-generation raised game media. Then, for each kind of fixed-type information, the fixed-type-information parameter modification unit 231 adds the sum to the raising parameter corresponding to the kind of fixed-type information.

The raising-game execution unit 23c executes an inheritance event a prescribed number of times (e.g., three times) at prescribed timings during the proceeding of the raising game. In the inheritance event, the lottery-type-information parameter modification unit 232 modifies the raising parameters corresponding to individual items of lottery-type information on the basis of the results of probability-based lotteries (S04).

Specifically, in response to the occurrence of an inheritance event, for each kind of lottery-type information of the game media to inherit and the previous-generation raised game media, the inheritance determination unit 232a determines whether or not to modify the raising parameter on the basis of the probability of expression corresponding to the item of lottery-type information. In one example, first, on the basis of the matching between the game medium to raise and the game media to inherit and previous-generation raised game media, the correction processing unit 232c individually corrects the probabilities of expression associated with the items of lottery-type information of the game media to inherit and the previous-generation raised game media. On the basis of the corrected probabilities of expression, the inheritance determination unit 232a determines whether or not each of the items of lottery-type information of the game media to inherit and the previous-generation raised game media is to be inherited by the game medium to raise, i.e., whether or not to change the corresponding raising parameter.

Then, for the lottery-type information determined to be inherited, effect amounts therefor are determined. Specifically, the effect-amount calculation unit 232b calculates effect amounts associated with the lottery-type information determined by the inheritance determination unit 232a to be inherited. In one example, according to a probability distribution corresponding to the rank associated with each kind of the lottery-type information of the game media to inherit and the previous-generation raised game media, the effect-amount calculation unit 232b calculates an effect amount to be added to the raising parameter corresponding to the item of lottery-type information. Furthermore, the effect-amount calculation unit 232b adds an effect amount calculated for each kind of lottery-type information to the raising parameter corresponding to the item of lottery-type information.

As described above, the sum for each kind of fixed-type information, obtained by the fixed-type-information parameter modification unit 231, and the amount of addition for each kind of lottery-type information, obtained by the lottery-type-information parameter modification unit 232, are the amounts of changes in raising parameters, based on one or more items of characteristic information of the game media to inherit and the previous-generation raised game media. In one example, the initial values of individual parameters among the raising parameters, i.e., raising parameters at the start of the raising game, are the same as those of the parameters of characteristic information of the material game medium selected by the player. By adding the sum or the amount of addition indicating the amounts of changes to the initial values, the individual parameters among the raising parameters change (increase). Note that the amounts of changes in the raising parameters may involve the amounts of effect obtained by training the game medium to raise during the raising game.

Upon the end of the scenario of the raising game, the raising-game execution unit 23c finishes the raising game (S06). As the raising game comes to an end, the raised-game-medium addition unit 23d adds the game medium to raise that has been raised in the raising game through steps S03 to S06, as a raised game medium, to the raised game medium group (S07). Specifically, the raising-game execution unit 23c generates a raised game medium in which raising-game result information obtained by adding the amounts of changes including sums and the amounts to be added to the initial values of individual parameters among the raising parameters is associated with the character ID of the game medium to raise. Then, the raised-game-medium addition unit 23d stores the generated raised game medium in the storage device 14 in association with the raised game medium group.

The information processing device 10 sets the raised game medium obtained through S01 to S07 as a game medium to inherit, and may repeat steps S01 to S07 until obtaining a raised game medium having characteristic information desired by the player.

The information processing device 10, by means of the first-main-competition-game execution unit 23f, can cause the display device 13 to display the raised game medium group including the raised game medium obtained through S01 to S07, can accept the selection of one or more raised game media via the input unit 12, and can execute a main competition game.

Note that the player's selection of a game medium to raise is accepted in S01 in the above description, S01 is not necessarily required, and the game medium to raise may be predetermined by a game developer, a game administrator, or the like.

[Second Main Competition Game]

FIG. 16 is an example operation flowchart, concerning the second main competition game, of the information processing device according to the embodiment of the present invention.

The information processing device 10, by means of the second-main-competition-game execution unit 23g, accepts the setting of conditions for the second main competition game by the player (S11). Here, the second-main-competition-game execution unit 23g causes the display device 13 to display a race-condition setting screen (not shown), and accepts the setting of a race track, a race distance, the weather in the virtual space, a season, the number of participants, motivation, the strengths of NPCs, etc. via the screen.

Then, by means of the game-medium-to-use setting unit 23h, a raised game medium to use in the second main competition game is set (S12). Specifically, the game-medium-to-use setting unit 23h causes the display device 13 to display the game-medium-to-use selection screen G7, and accepts the selection of at least one raised game medium associated with another player via the other-players tab of the other-players representative tab or the other-players shared tab.

After S12, the second main competition game is executed by means of the second-main-competition-game execution unit 23g (S13). The second-main-competition-game execution unit 23g causes the display device 13 to display the process during the execution thereof and the result of the execution (S14). This makes it possible for the player to check the level of the ability or convenience of a raised game medium associated with another player in an actual race, which serves as a reference in determining whether or not to select the raised game medium as a game medium to inherit.

EFFECTS AND ADVANTAGES (1) The information processing device 10 in this embodiment is an information processing device that executes a game including a first main competition game and a raising game, in which a player raises a game medium in the raising game, the game medium being used in the first main competition game, the information processing device including: a game-medium-to-inherit acceptance unit 23b that accepts, as a game medium to inherit, a raised game medium selected from a raised game medium group including a plurality of raised game media that have been raised in the raising game, the game-medium-to-inherit acceptance unit 23b accepting, as a game medium to inherit, a raised game medium associated with another player; and a raising-game execution unit 23c that executes the raising game so as to modify a raising parameter that changes in the raising game, on the basis of one or more items of characteristic information included in the game medium to inherit associated with the other player, and so as to generate a raised game medium associated with the player on the basis of the raising parameter upon the completion of the raising game.

This makes it possible to provide sociality in a raising game such that a player may be affected by other players, which serves to improve the fun of a game. For example, since a raised game medium of a player can inherit abilities, etc. of a raised game medium of another player, the variations of raising are expanded compared with the case of inheriting only raised game media of the player himself or herself, which serves to improve the fun of a game.

(2) The game includes a second main competition game. The information processing device 10 includes: a game-medium-to-use setting unit 23h that sets, through selection by the player, a raised game medium to use in the second main competition game; and a second-main-competition-game execution unit 23g that executes the second main competition game on the basis of the raised game medium set by the game-medium-to-use setting unit 23h. The game-medium-to-use setting unit 23h sets a raised game medium selected by the player and associated with the other player as a raised game medium to use in the second main competition game. The second-main-competition-game execution unit 23g executes the second main competition game on the basis of the raised game medium selected by the player and associated with the other player.

This makes it possible for the player to check how the second main competition game actually proceeds and the result of the execution thereof before determining whether or not to select the raised game medium of the other player, used in the second main competition game, as a game medium to inherit in the raising game.

(3) An inheritance-history-information creation unit 23i is provided, which creates inheritance history information of the raised game medium selected by the other player via the game-medium-to-inherit acceptance unit 23b and associated with the player.

This makes it possible to cause the display device 13 of the player to display inheritance history information, which allows the player to check the inheritance history information, serving as a resource for determining whether or not to select a raised game medium as a game medium to inherit in the raising game. Furthermore, the player can check how often his or her own raised game media are inherited by other players, thereby knowing the popularity of the raised game media, as well as the achievement of his or her own raising.

(4) An other-player's-raised-game-medium addition unit 23e is provided, which adds the raised game medium that has been raised by the raising-game execution unit 23c in the raising game and that is associated with the other player to the raised game medium group as a raised game medium associated with the player.

This makes it possible for the player to enjoy the achievements of raising by other players, which serves to expand variations of raising. For example, since a player can obtain a raised game medium that the player does not possess from another player and cause the raised game medium as a game medium to inherit, which makes it possible to create a variety of raised game media or to create a raised game medium desired by the player. Furthermore, since the player can select the raised game medium as a game medium to inherit when the player plays the raising game for the next time, it is possible to raise a game medium to raise so that the game medium to raise gradually becomes close to an ideal game medium for the player.

(5) A raised-game-medium addition unit 23*d* is provided, which adds the raised game medium that has been raised by the raising-game execution unit 23*c* in the raising game and that is associated with the player to the raised game medium group as a raised game medium associated with the player. This makes it possible for the player to select a raised game medium raised via the raising-game execution unit 23*c* as a game medium to inherit when the player plays the raising game for the next time. Thus, it is possible to raise a game medium to raise so that the game medium to raise gradually becomes close to an ideal game medium for the player.

Specifically, in the case where the player wishes to create a raised game medium that is strong with short distances, after creating a raised game medium having short-distance characteristic information when the player plays the raising game for the n-th time (n is a natural number), when the player plays the raising game for the (n+1)-th time, the player can select a game medium to raise having short-distance characteristic information, and can select, as a game medium to inherit, a raised game medium having short-distance characteristic information, which makes it possible to create a raised game medium that is strong with short distances or that is specialized for short distances. Furthermore, after creating a raised game medium having prescribed characteristic information when the player plays the raising game for the n-th time (n is a natural number), such as short distances, when the player plays the raising game for the (n+1)-th or later time, it is possible to select, as game media to inherit, a raised game medium having characteristic information other than the prescribed characteristic information, such as short distances, together with the raised game medium having the prescribed characteristics, such as short distances. This makes it possible to create a raised game medium specialized for a plurality of characteristics. Therefore, it is possible to obtain raised game media with rich variations.

(6) The information processing device 10 in this embodiment is an information processing device that executes a game including a main competition game and a raising game, in which a player raises a game medium in the raising game, the game medium being used in the main competition game, the information processing device including: a game-medium-to-raise acceptance unit 23*a* that accepts a game medium to raise selected by the player, which is raised in the raising game; a game-medium-to-inherit acceptance unit 23*b* that accepts, as a game medium to inherit, a raised game medium selected from a raised game medium group including a plurality of raised game media that have been raised by the player in the raising game; and a raising-game execution unit 23*c* that executes the raising game by using the game medium to raise as a subject of raising so as to modify a raising parameter that changes in the raising game, on the basis of one or more items of characteristic information included in the game medium to inherit, and so as to generate a raised game medium by associating a character ID and a raising parameter included in the game medium to raise upon the completion of the raising game. In particular, in this embodiment, the game-medium-to-raise acceptance unit 23*a* is configured to accept, as a game medium to raise, a material game medium selected by the player from a material game medium group.

This makes it possible to improve the fun of the game. For example, in conventional horse racing games, in what is called breeding, in which two horses that serve as parents are combined to produce a foal, the player selects two horses that serve as parents (stallion and mare); however, the foal is automatically generated by the game program, leaving no room for selection by the player, which makes it difficult to create a desired horse. Meanwhile, in this embodiment, the player is allowed to select a game medium to raise, serving as a subject of raising, as well as a game medium to inherit. This serves to improve the fun of a game.

(7) The one or more items of characteristic information include fixed-expression-type information, with which the expression of an effect is fixed upon the start of the raising game. The raising-game execution unit 23*c* includes a fixed-type-information parameter modification unit 231 that modifies raising parameters corresponding to fixed-expression-type information of game media to inherit. This makes it possible to obtain a raised game medium with which characteristics are reinforced upon the start of the raising game.

(8) The one or more items of characteristic information include lottery-type information, which is expressed through probability-based lotteries that are executed at prescribed timings during the raising game. The raising-game execution unit 23*c* includes a lottery-type-information parameter modification unit 232 that modifies raising parameters corresponding to individual items of lottery-type information on the basis of the results of lotteries.

Accordingly, since parameters are processed on the basis of lotteries, it is possible to obtain raised game media going beyond player's expectations. Furthermore, since parameters are processed on the basis of lotteries in a state where a prescribed effect amount has been added to a raised game medium due to fixed-expression-type information, which ensures a certain improvement in the ability of the raised game medium, even if a lottery is missed for characteristic information desired by the player, it is possible to ensure a certain level of raising, or to obtain a raised game medium going beyond player's expectations.

(9) The lottery-type-information parameter modification unit 232 is configured to include an inheritance determination unit 232*a* that determines, for each item of lottery-type information, whether or not to modify the raising parameter corresponding to the item of lottery-type information on the basis of the probability of expression corresponding to the item of lottery-type information. Accordingly, since it is not known to the player in advance which item of characteristic information will be inherited, it is possible to improve the fun of the game.

(10) The lottery-type-information parameter modification unit 232 is configured to include an effect-amount calculation unit 232*b* that calculates an effect amount on the basis of a weight for the effect amount for modifying the raising parameter associated with the determined item of lottery-type information. Accordingly, even when the characteristic information to be inherited has been determined, the level of the amount of effect that is given is determined depending on the weight (e.g., a probability distribution), which is not fixed. This serves to improve the fun of the game.

(11) The lottery-type-information parameter modification unit 232 is configured to include a correction processing unit 232*c* that corrects the probabilities of expression corresponding to items of lottery-type information on the basis of the matching between the game medium to raise and the game media to inherit. This makes it possible to provide the player with the fun of considering combinations of a game medium to raise and game media to inherit.

(12) A raised game medium has associated therewith a second raised game medium set as a game medium to inherit when the raised game medium was raised in the raising game. The raising-game execution unit 23*c* is configured to execute the raising game so as to modify the raising parameter on the basis of one or more items of characteristic information included in the second raised game medium, thereby correcting the probability of expression corresponding to the lottery-type information of the second raised game medium on the basis of the matching between the raised game medium and the second raised game medium.

This enables raising in consideration of not only relationships between the game medium to raise and the game medium to inherit but also the matching with a previous-generation raised game medium (the second raised game medium) of the game medium to inherit. This enables various ways of raising, which serves to improve the fun of the game.

[Embodiment Implemented by System]

Figure 17:
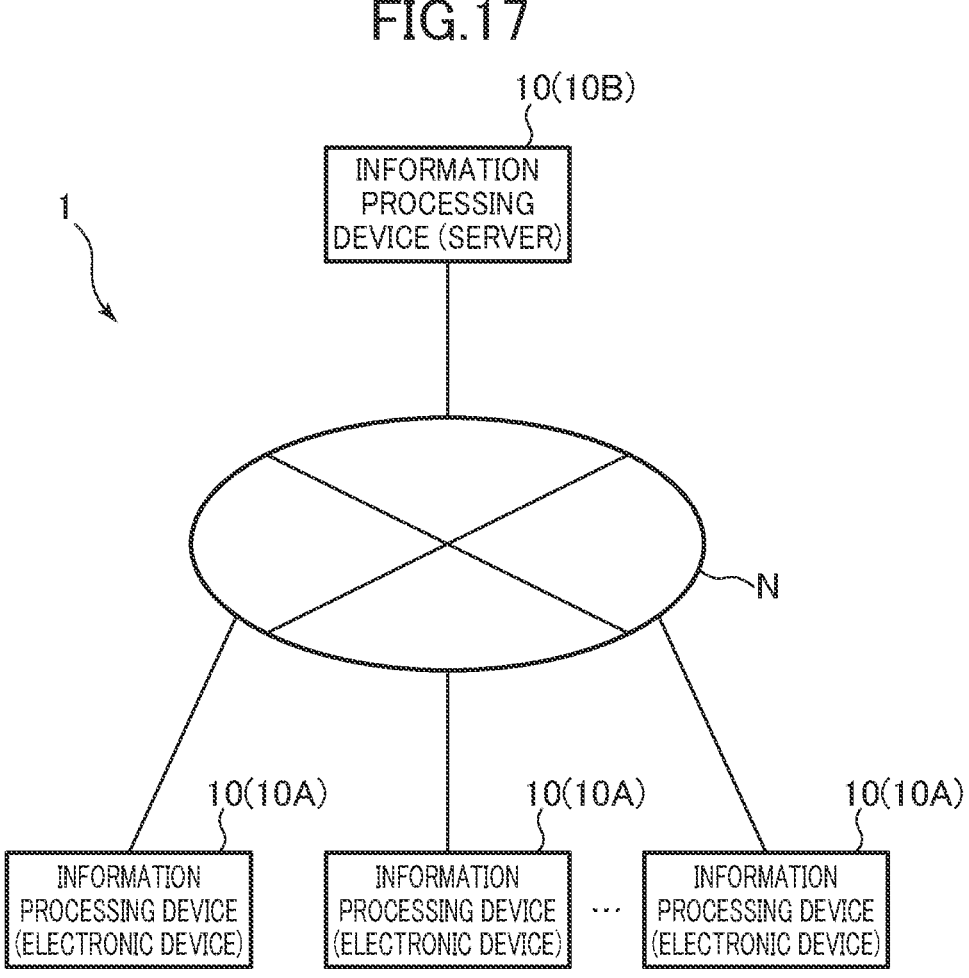
FIG. 17 is a diagram showing an example overall configuration of a game system according to an embodiment of the present invention.

FIG. 17 is a diagram showing an example overall configuration of a game system according to an embodiment of the present invention. As shown in FIG. 17, a game system 1 includes a plurality of information processing devices 10. Among the plurality of information processing devices 10, at least one is a server 10B, and the other information processing devices 10 are electronic devices 10A serving as user terminals that are used by individual players. The electronic devices 10A and the server 10B are connected to a network N, such as the Internet, so as to enable mutual communication therewith. Note that although the game system 1 in this embodiment is assumed to be a server-client system in the description, the game system 1 may be configured by using a system not including the server 10B, such as P to P.

Each of the electronic devices 10A has the same hardware configuration as that shown in FIG. 1, and is assumed to be a smartphone also in this embodiment. The server 10B is a server device that provides a game that can be executed on the electronic devices 10A, and is constituted of one or more computers.

The server 10B stores various programs including a control program for controlling the proceeding of an online game, as well as various kinds of data that are used in the game.

In one example, the server 10B is configured to be able to provide the electronic devices 10A with a game application that can be executed on the electronic devices 10A. The electronic devices 10A, when executing the downloaded game application, proceeds with the game while transmitting data to and receiving data from the server 10B, periodically or as needed. For example, the server 10B stores various kinds of setting information, history information, etc. necessary for the game executed on the electronic devices 10. In this case, each of the electronic devices 10A includes the functions of the input unit 21, the display unit

22, the game control unit 23, and the individual functional units in the game control unit 23.

In one example, the server 10B is a web server, and provides the electronic devices 10A with a game service. The electronic devices 10A obtain HTML data for displaying webpages from the server 10B, and parse the obtained HTML data to display the webpages. In this case, the server 10B that communicates with the electronic devices 10A has the functions of the game control unit 23 in part or in entirety. For example, each of the electronic devices 10A accepts the selection of a game medium to raise and game media to inherit by the player via the input unit 21 (the input unit 12), the raising-game execution unit 23*c* of the server 10B executes the raising game, and the first-main-competition-game execution unit 23*f* of the server 10B executes the first main competition game. Furthermore, the second-main-competition-game execution unit 23*g* of the server 10B may execute the second main competition game. The server 10B transmits information indicating the process and the result of the execution of the first main competition game and the second main competition game to an electronic device 10A, and causes the display device 13 of the electronic device 10A to display the information. The server 10B manages raised game media associated with the player and other players. For example, the server 10B shares information such as the character IDs of the raised game media among individual players. In one example, raised game media (e.g., representative game media) associated with other players are shared among players belonging to a group such as a circle in the game, at least in the raising game and in the second main competition game. In another example, information such as the character IDs of raised game media is shared among players by using a chat function of the game control unit 23 in the game.

Other Embodiments

Another embodiment of the present invention may be a program for realizing the functions or the information processing shown in the flowcharts in the above-described embodiments of the present invention, or a computer-readable storage medium storing the program. Alternatively, another embodiment of the present invention may be a method for realizing the functions or the information processing shown in the flowcharts in the above-described embodiments of the present invention. Alternatively, another embodiment of the present invention may be a server that is capable of providing a computer with a program for realizing the functions or the information processing shown in the flowcharts in the above-described embodiments of the present invention. Alternatively, another embodiment of the present invention may be a virtual machine for realizing the functions or the information processing shown in the flowcharts in the above-described embodiments of the present invention.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

For example, although the other-player's-raised-game-medium addition unit 23*e* is included in the above-described embodiment, without limitation thereto, an aspect not including the other-player's-raised-game-medium addition unit 23*e* is also encompassed in the present invention.

Although the lottery-type-information parameter modification unit 232 includes the inheritance determination unit 232*a* and the effect-amount calculation unit 232*b* in the above-described embodiment, one of the inheritance determination unit 232*a* and the effect-amount calculation unit 232*b* may be omitted. In the case where the inheritance determination unit 232*a* is omitted, while the expression of lottery-type information is fixed, effect amounts therefor are determined through probability-based lotteries in the effect-amount calculation unit 232*b*. In the case where the effect-amount calculation unit 232*b* is omitted, the inheritance determination unit 232*a* determines whether or not to modify raising parameters corresponding to lottery-type information, and when the raising parameters are to be modified, the effect-amount calculation unit 232*b* uses fixed values corresponding to the lottery-type information as the effect amounts.

In the above-described embodiment, without limitation to the case where various abilities and skills are provided in the various parameters of characteristic information associated with material game media, game media to raise, raised game media, and game media to inherit, also in the case where no abilities or skills are provided, all the parameters are set, for example, by setting zero as the parameter values; alternatively, it is possible to set only parameters with which various abilities or skills are provided. In this case, when characteristic information inherited to the game medium to raise from a game medium to inherit or a previous-generation raised game medium is absent in the raising parameters, processing may be executed so as to newly define a parameter for the inherited characteristic information as a variable. In other words, for a game medium to raise to inherit one or more items of characteristic information of a game medium to inherit or a previous-generation raised game medium thereof is to add an amount of change based on the game medium to inherit or the previous-generation raised game medium thereof to a raising parameter, which includes the following: in the case where the kind of characteristic information corresponding to the amount of change already exists among the raising parameters, the corresponding raising parameter is modified; whereas in the case where the kind of characteristic information corresponding to the amount of change does not exist among the raising parameters, the kind of characteristic information corresponding to the amount of change is newly added to the raising parameters.

In the above-described embodiment, in order to save a material game medium, when a subject of raising has been selected, the selected material game medium is copied, for example, into a volatile recording medium, thereby generating a game medium to raise, so that the material game medium and the game medium to raise are data that differ from each other with respect to only the IDs thereof; alternatively, a material game medium may be used directly as a game medium to raise, without copying the material game medium. That is, the arrangement may be such that at least after the completion of the raising game, the material game medium is overwritten with the result of raising such that the result of raising is stored in the storage device 14 as a raised game medium.

In the above-described embodiment, the matching between a game medium to raise and game media to inherit, as well as the matching between the game medium to raise and previous-generation raised game media serving as inheritance sources for the game media to inherit, are reflected in the probabilities of expression in the inheritance determination unit 232*a* by the correction processing unit 232*c*; alternatively, these kinds of matching may be reflected in the probability distribution in the effect-amount calculation unit 232*b*. That is, the correction processing unit 232*c* may correct the probability distribution of effect amounts on the basis of matching, namely, the matching between game medium to raise and the game media to inherit and/or the matching between the game medium to raise and the previous-generation raised game media serving as inheritance sources for the game media to inherit. For example, the correction processing unit 232*c* may perform correction so as to increase the probabilities of prescribed effect amounts relative to the probabilities of the other effect amounts in the probability distribution in the case where each relationship between the game medium to raise and the game media to inherit or each relationship between the raising game and the previous-generation raised game media has a matching bonus value not less than a prescribed value. That is, the peak in the probability distribution is shifted. In one example, the peak in the probability distribution may be shifted to the side of higher effect amounts by relatively increasing the probabilities of effect amounts greater than or equal to a prescribed value (e.g., in the case of the probability distribution for rank 1 in Table 1, effect amounts of 6 or greater) and relatively decreasing the probabilities of effect amounts less than the prescribed value (effect amounts of 5 or less).

Alternatively, the raising-game execution unit 23*c* may include a parameter correction unit that increases or decreases raising parameters on the basis of the matching between the game medium to raise and the game media to inherit. This makes it possible to enjoy variations in the combinations of selecting a game medium to raise and game media to inherit, which serves to improve the fun of the game. The parameter correction unit increases or decreases a raising parameter by adding a matching bonus value (e.g., a positive or negative value) associated with one or more relationships constituting matching to the fixed value of the material game medium selected as the game medium to raise.

In the above-described embodiment, the character ID and the raising parameters of the game medium to raise are handled independently during the raising game; however, the character ID and the raising parameters may be constantly associated with each other.

The first and second main competition games may be ballgames, such as baseball, football, or tennis, competition games such as track and field, role-playing games (RPGs), shooting games, or puzzle games. In this case, for example, game media are characters representing players of ballgames or track and field or a main character or persons relating to the main character.

REFERENCE SIGNS LIST

1 Game system
10 Information processing device
10A Electronic device
10B Server
11 Processor
12 Input device
13 Display device
14 Storage device
15 Communication device
16 Bus
21 Input unit 22 Display unit
23 Game control unit
23a Raised-game-medium acceptance unit
23b Game-medium-to-inherit acceptance unit
23c Raising-game execution unit
231 Fixed-type-information parameter modification unit
232 Lottery-type-information parameter modification unit
232a Inheritance determination unit
232b Effect-amount calculation unit
232c Correction processing unit
23d Raised-game-medium addition unit
23e Other-player's-raised-game-medium addition unit
23f First-main-competition-game execution unit
23g Second-main-competition-game execution unit
23h Game-medium-to-use setting unit
23i Inheritance-history-information creation unit
23j Representative-game-medium setting unit
N Network

The invention claimed is:

1. A non-transitory computer readable medium storing a program, wherein the program causes a computer to perform a method comprising:

executing, by a first player and within a computer game, a raising game using one or more items of characteristic information including lottery-type information to produce a first raised game character, wherein the one or more items of characteristic information including lottery-type information are associated with a second raised game character of a second player selected by the first player within the computer game, wherein the raising game executes a probability-based lottery associated with the lottery-type information at a plurality of predetermined timings, wherein the raising game modifies a raising parameter of a game character based on a plurality of results of the probability-based lottery to produce the first raised game character, wherein the computer game comprises a first main competition game and the raising game, and wherein the first raised game character is used in the first main competition game to compete against a plurality of game characters;

generating a game medium group including a plurality of raised game characters and the first raised game character; and executing, by the first player and within the computer game, the first main competition game using the first raised game character, wherein the second player is different from the first player.

2. The non-transitory computer readable medium according to claim 1, wherein the computer game further comprises a second main competition game, wherein the method further comprises:

setting means for setting, through selection by the first player, the second raised game character to use in the second main competition game; and executing the second main competition game based on the second raised game character.

3. The non-transitory computer readable medium according to claim 1, wherein the method further comprises:

creating inheritance history information of the first raised game character.

4. The non-transitory computer readable medium according to claim 1, wherein the second raised game character is added to the game medium group.

5. The non-transitory computer readable medium according to claim 1, wherein the first raised game character is added to the game medium group.

6. An information processing device comprising:

a computer processor; and a memory connected to the computer processor, wherein the memory comprises a program configured to perform a method comprising:

executing, by a first player and within a computer game, a raising game using one or more items of characteristic information including lottery-type information to produce a first raised game character, wherein the one or more items of characteristic information including lottery-type information are associated with a second raised game character of a second player selected by the first player within the computer game, wherein the raising game executes a probability-based lottery associated with the lottery-type information at a plurality of predetermined timings, wherein the raising game modifies a raising parameter of a game character based on a plurality of results of the probability-based lottery to produce the first raised game character, wherein the computer game comprises a first main competition game and the raising game, and wherein the first raised game character is used in the first main competition game to compete against a plurality of game characters;

generating a game medium group including a plurality of raised game characters and the first raised game character; and executing, by the first player and within the computer game, the first main competition game using the first raised game character, wherein the second player is different from the first player.

7. A method comprising:

executing, by a first player and within a computer game, a raising game using one or more items of characteristic information including lottery-type information to produce a first raised game character, wherein the one or more items of characteristic information including lottery-type information are associated with a second raised game character of a second player selected by the first player within the computer game, wherein the raising game executes a probability-based lottery associated with the lottery-type information at a plurality of predetermined timings, wherein the raising game modifies a raising parameter of a game character based on a plurality of results of the probability-based lottery to produce the first raised game character, wherein the computer game comprises a first main competition game and the raising game, and wherein the first raised game character is used in the first main competition game to compete against a plurality of game characters;

generating a game medium group including a plurality of raised game characters and the first raised game character; and executing, by the first player and within the computer game, the first main competition game using the first raised game character, wherein the second player is different from the first player.

8. A game system comprising:

an electronic device and a server connected to the electronic device via a network, wherein the electronic device or the server are configured to perform a method comprising:

executing, by a first player and within a computer game, a raising game using one or more items of characteristic information including lottery-type information to produce a first raised game character, > wherein the one or more items of characteristic information including lottery-type information are associated with a second raised game character of a second player selected by the first player within the computer game, > wherein the raising game executes a probability-based lottery associated with the lottery-type information at a plurality of predetermined timings,
> wherein the raising game modifies a raising parameter of a game character based on a plurality of results of the probability-based lottery to produce the first raised game character,
> wherein the computer game comprises a first main competition game and the raising game, and
> wherein the first raised game character is used in the first main competition game to compete against a plurality of game characters;

generating a game medium group including a plurality of raised game characters and the first raised game character; and executing, by the first player and within the computer game, the first main competition game using the first raised game character, wherein the second player is different from the first player.

\* \* \* \* \*